(12) United States Patent
Orishima et al.

(10) Patent No.: US 7,695,691 B2
(45) Date of Patent: Apr. 13, 2010

(54) DISCHARGE CELL FOR OZONIZER

(75) Inventors: Hiroshi Orishima, Kobe (JP); Akihiko Teramoto, Kobe (JP); Tatsuo Kikuchi, Itami (JP); Yuuji Terashima, Ashiya (JP); Noriyo Sotani, Ootsu (JP); Masaya Yoshimura, Osaka (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 1179 days.

(21) Appl. No.: 11/230,628

(22) Filed: Sep. 21, 2005

(65) Prior Publication Data

US 2006/0024220 A1    Feb. 2, 2006

Related U.S. Application Data

(62) Division of application No. 10/049,018, filed as application No. PCT/JP00/03758 on Jun. 9, 2000, now abandoned.

(51) Int. Cl.
*B01J 19/08* (2006.01)
(52) U.S. Cl. .................................. 422/186.2
(58) Field of Classification Search ............ 422/186.07, 422/186.2
See application file for complete search history.

(56) References Cited

U.S. PATENT DOCUMENTS

| | | | |
|---|---|---|---|
| 4,034,229 A | 7/1977 | Grossen et al. | |
| 4,606,892 A | 8/1986 | Bachhofer et al. | |
| 5,637,279 A | * 6/1997 | Besen et al. | 422/186.07 |
| 5,759,497 A | 6/1998 | Kuzumoto et al. | |
| 6,284,205 B1 | 9/2001 | Murata et al. | |

FOREIGN PATENT DOCUMENTS

| | | |
|---|---|---|
| EP | 679608 | 11/1995 |
| JP | 80651 | 2/1929 |
| JP | 54-009187 A * | 1/1979 |
| JP | 55-3334 | 1/1980 |
| JP | 55-042278 | 3/1980 |
| JP | 55-42278 | 3/1980 |
| JP | 55-144407 | 11/1980 |
| JP | 55-162410 | 12/1980 |
| JP | 55-162410 A * | 12/1980 |
| JP | 08-012304 | 1/1996 |
| JP | 9-142811 | 6/1997 |
| JP | 11-157807 | 6/1999 |
| WO | PCT/US95/10764 | 3/1996 |

* cited by examiner

*Primary Examiner*—Kishor Mayekar
(74) *Attorney, Agent, or Firm*—Oblon, Spivak, McClelland, Maier & Neustadt, L.L.P.

(57) ABSTRACT

This is a discharge cell used for an ozonizer. A space where a discharge gap amount is determined between the first electrodes 10 and 10 is formed by stacking a couple of upper and lower first electrodes 10 and 10, constituted by the plate-like rigid body, in both sides with sandwiching a couple of rigid body spacers 20 and 20. In this space, a dielectric body unit 30 that consists of a rigid body of the sandwich structure of sandwiching a second electrode 32 is arranged between glass plates 31 and 31. The dielectric body unit 30 is supported in a neutral position in the space by a plurality of spacers 40, 40, ... for discharge gap formation that are inserted between the upper and lower first electrodes 10, and forms discharge gaps 50 and 50 in both sides. The minimum discharge gap amount G of 0.4 mm or less is stably secured. It is possible to prevent the damage of a cell component and a pressurizing mechanism.

25 Claims, 16 Drawing Sheets

FIG 3
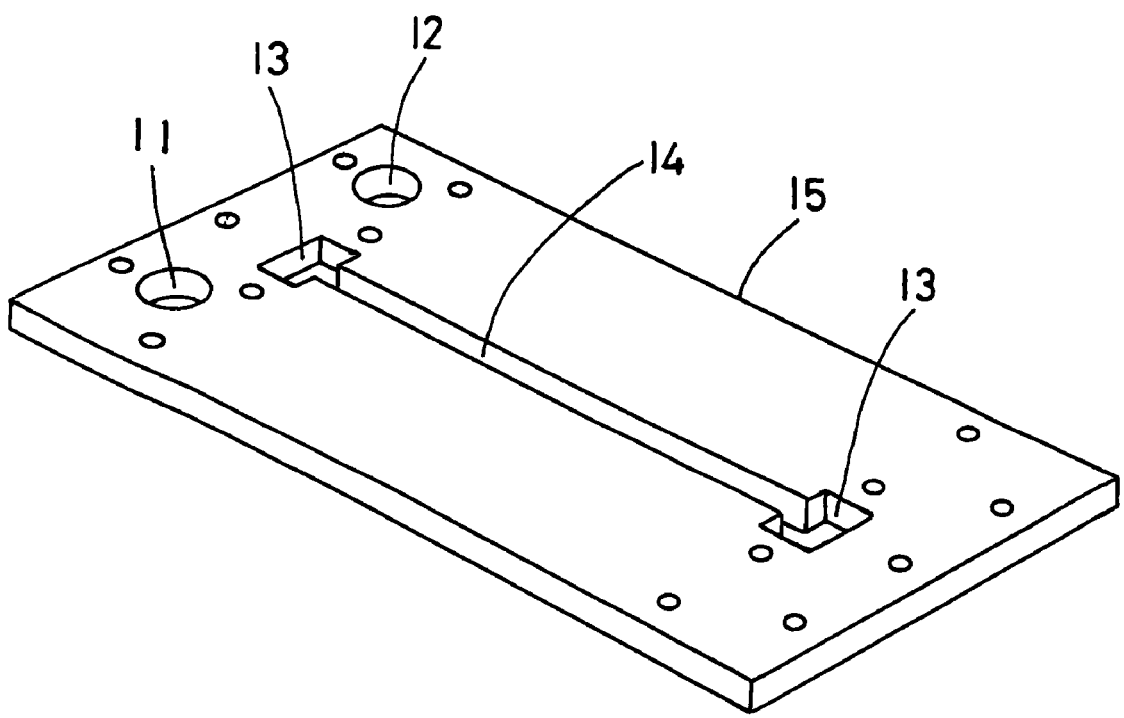
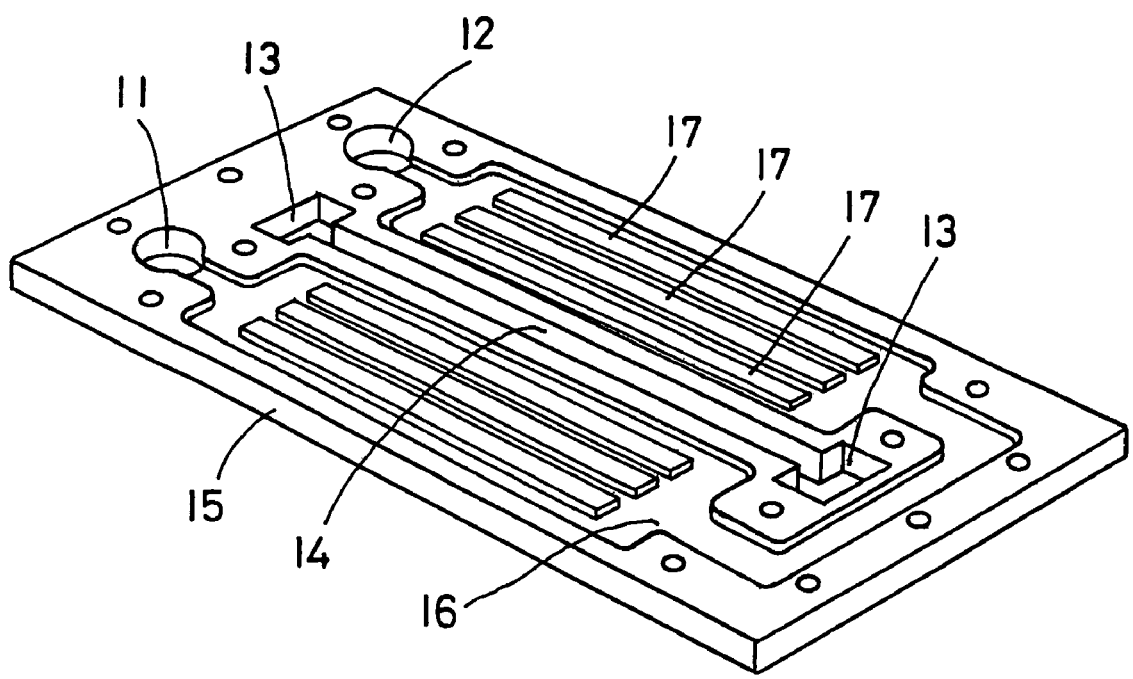

FIG 6
(a)
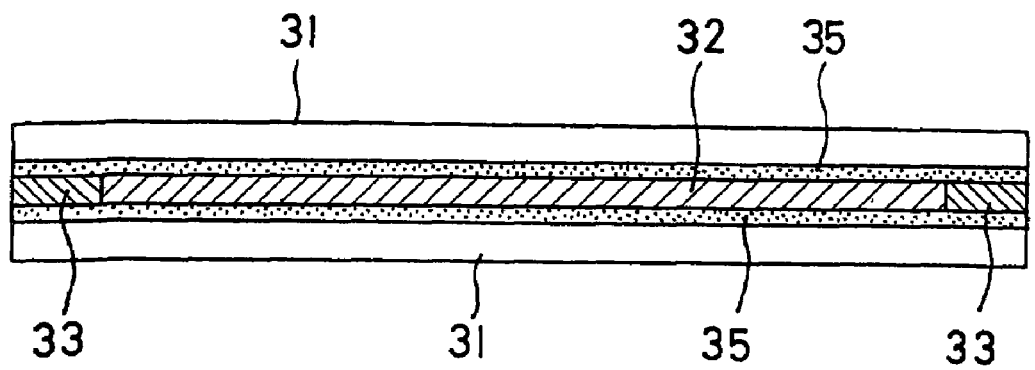
(b)
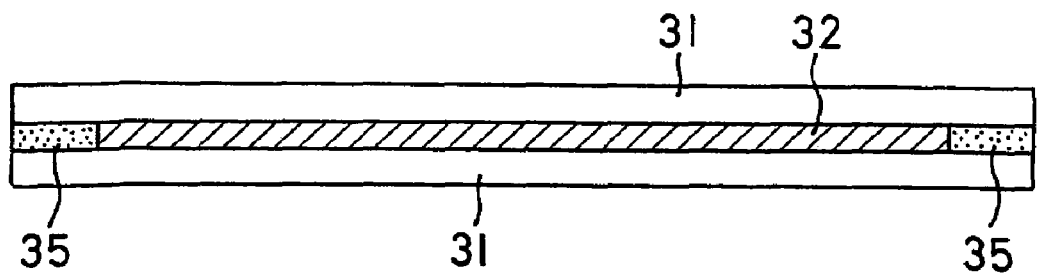
(c)
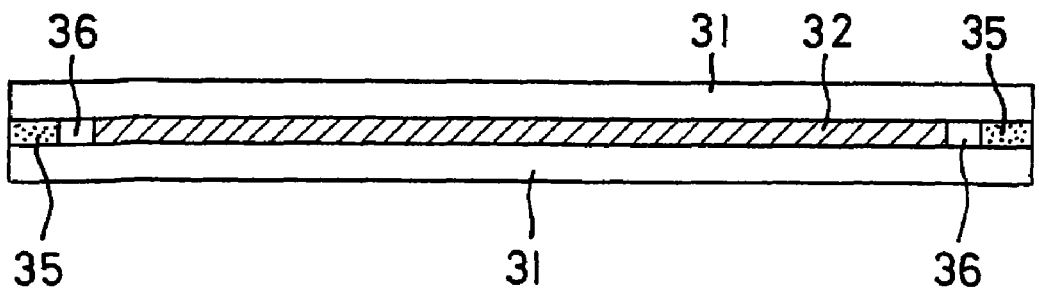

FIG 9
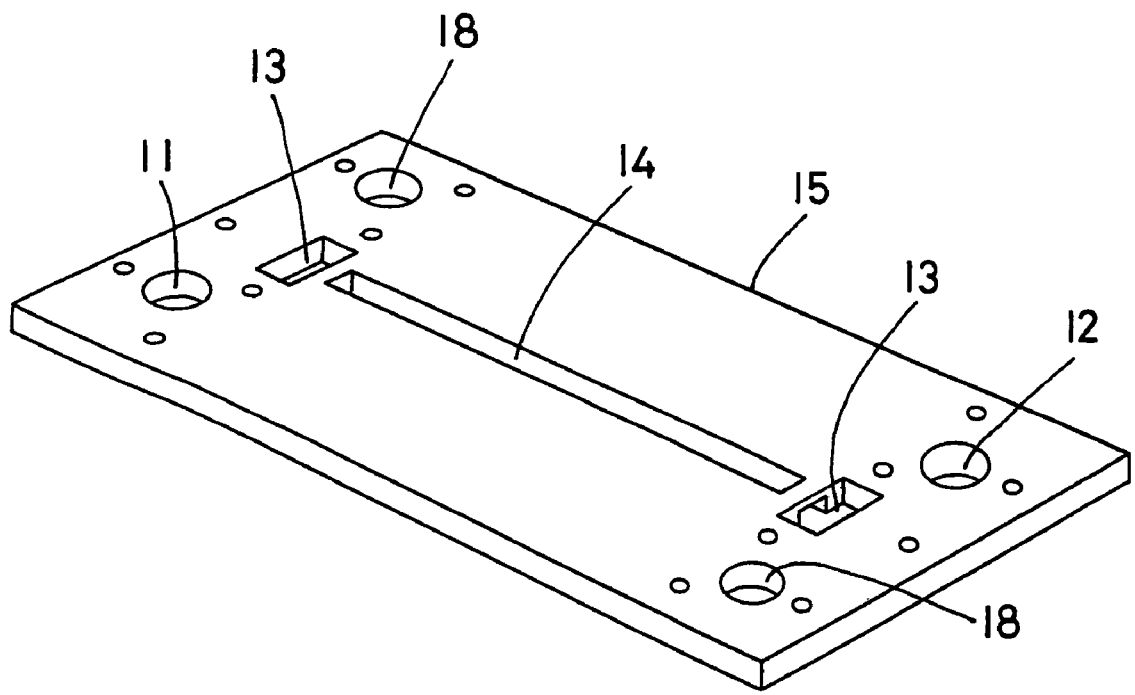
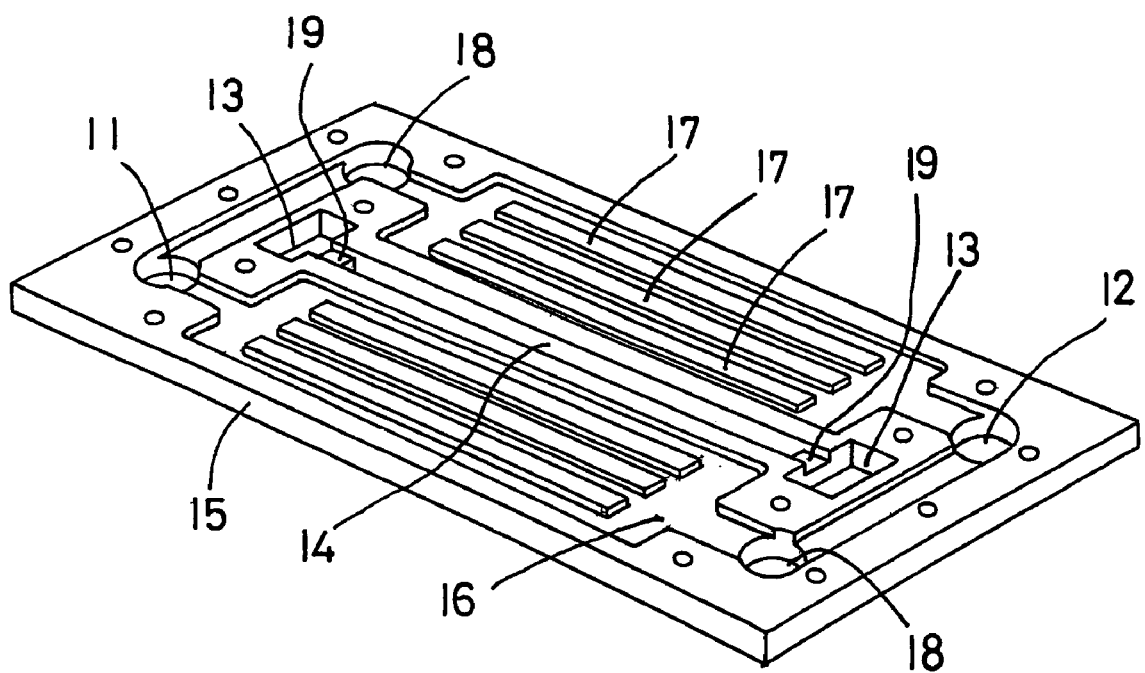

FIG 14
(a)
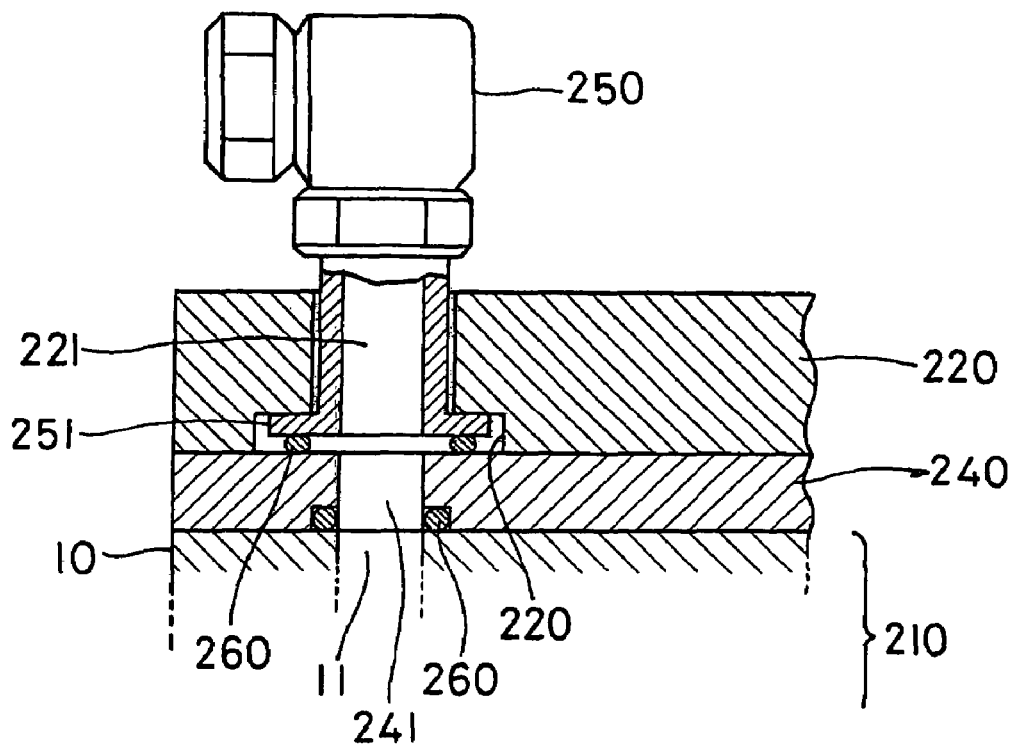
(b)
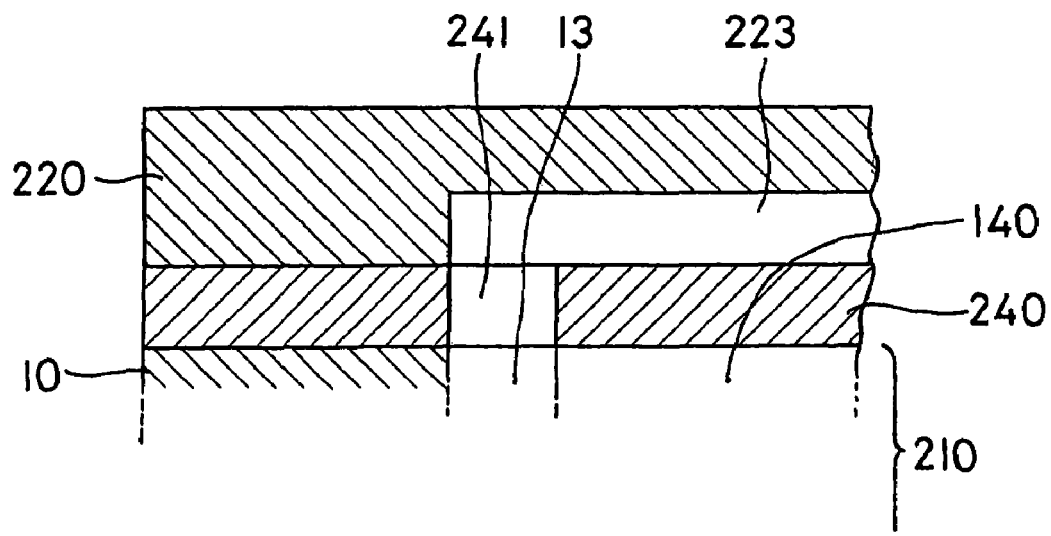

DISCHARGE CELL FOR OZONIZER

This is a divisional application of U.S. application Ser. No. 10/049,018 filed Sep. 9, 2002, now abandoned, which is 35 USC 371 National Stage filing of PCT/JP/03758 on Jun. 9, 2000.

BACKGROUND OF THE INVENTION

1. Field of the Invention

The present invention relates to a discharge cell used for a plate type ozonizer.

2. Description of the Related Art

A discharge cell shown in FIG. 16 is known as one of discharge cells used for plate type ozonizers.

The discharge cell shown in FIG. 16 comprises a couple of low voltage electrodes 1 and 1 acting for a heat sink, a dielectric body unit 2 arranged between the couple of low voltage electrodes 1 and 1, spacers 4, 4 . . . for forming discharge gaps 3 in both sides of the dielectric body unit 2. The dielectric body unit 2 has multilayer structure where a high-voltage electrode 2b intervenes between two glass plates 2a and 2a as a dielectric body. The spacers 4, 4 . . . . includes metal, ceramics, glass, or a resin, and are arranged in predetermined intervals in the direction perpendicular to a direction of gas circulation in the discharge gaps 3.

In a usual plate type ozonizer, it is made to form the discharge cell by making the low voltage electrodes 1 and 1 and dielectric body unit 2 be a module, and by stacking the modules in the thickness direction with making the low voltage electrodes 1 and 1 shared between adjoining modules.

When generating ozone, it is performed to apply a predetermined high voltage to the high voltage electrode 2b in the dielectric body unit 2 with circulating a raw material gas comprising an oxygen gas or a mixed gas including an oxygen gas into the discharge gaps 3 and 3 formed in both sides of the dielectric body unit 2. Since a silent discharge arises in the discharge gaps 3 and 3 by applying a high voltage, the oxygen gas in the raw material gas is ozonized.

In such a discharge cell for a plate type ozonizer, current tendency is to make each gap amount G of the discharge gaps 3 and 3 be small. It is considered that this is because it becomes possible by making each gap amount G of the discharge gaps 3 and 3 be small to highly concentrate the ozone gas since the cooling efficiency of the discharge gaps 3 and 3 increases, it becomes possible to obtain a discharge effect suitable for ozone generation, and it becomes possible to reduce the thickness of the high voltage electrode 2a, and by extension to the thickness of the discharge cell since it becomes possible to simplify the cooling structure of the high voltage electrode 2a by the cooling efficiency in the discharge gaps 3 and 3 increasing.

Then, as for the reduction of each amount G of discharge gaps (hereinafter, a discharge gap amount G), it is mentioned in the laid-open specification of PCT/US/10764 that it is effective to make it be 0.005 inches or less (0.13 mm or less). Actually, also according to the test and analysis by the present inventor et al., it is apparently effective to the generation of high concentration ozone that each discharge gap amount G is 0.4 mm or less, and in particular, 0.2 mm or less.

However, it is not easy to stably realize a minimum discharge gap amount G that is 0.2 mm or less in amass production level.

That is, in order to realize the minimum discharge gap amounts G, the spacers 4, 4 . . . having the thickness that is the same as the discharge gap amounts G are necessary. As described above, metal, ceramics, glass, or a resin is used as the material of the spacers 4, 4 . . . .

In the discharge cell shown in FIG. 16, pressure F in a cell assembly (hereinafter, cell assembly pressure F) is directly applied to the spacers 4, 4 . . . . Hence, if the spacers 4, 4 . . . are made of elastic bodies such as a resin, the magnitude of the gap amounts G of discharge gaps changes with the magnitude of the cell assembly pressure F, and hence it is difficult to stably manage the discharge gap amounts G at a constant value.

If the spacers 4, 4 . . . are made of rigid bodies such as metal, ceramics, or glass, compression in the thickness direction does not arise, and hence predetermined discharge gap amounts G are secured once. But, since the cell assembly pressure F is directly applied to the spacers 4, 4 . . . and the dielectric body unit 2, depending on the magnitude of the cell assembly pressure F, there is a possibility that the minute spacers 4, 4 . . . may be damaged or the glass plates 2a and 2a in the dielectric body unit 2 may be damaged.

In addition, since it is necessary to equally pressurize the whole discharge cell in any cases, it cannot be avoided to upsize a pressurizing mechanism (clamping mechanism).

In addition, in the above-described discharge cell, since the gas circulates in parallel and one-way traffic from the front of the discharge gaps 3 and 3 to the back, it is necessary to take out the ozone gas through a comparatively large header attached in the back face of the discharge cell. For this reason, the ozonizer is further enlarged, and hence manufacturing cost also increases.

Furthermore, in a usual discharge cell, as described above, since the stacked structure where many modules are stacked in the thickness direction is adopted, a laminated face appears in the back face, on which the header is attached, as it is, and hence it is not flat. For this reason, since it is difficult to perform sealing between the discharge cell and header, this sealing cost also increases.

In a discharge cell for an ozonizer, it is important to miniaturize the discharge cell with keeping the same performance, or to enhance performance without upsizing the discharge cell. There are several methods for enhancing the performance, and one of them is to enhance ozone-generating efficiency by suppressing temperature increase in the discharge gaps 3 and 3. For this reason, electrodes, that is, at least the low voltage electrodes 1 and 1 are made to be coolers with jacket structure to entirely cool the discharge gaps 3 and 3 from both sides. There is thinning of a cell module as another method. Supposing the thickness of each module is reduced to one half, cell modules whose number is twice as many as the number of conventional cell modules can be arranged in the same space, and hence performance is enhanced twice.

However, it is difficult to thin a cell module in a conventional discharge cell. A main reason is that the thickness of the cooler is dominant over that of the cell module. Since essentially having large thickness in comparison with other components such as a dielectric body made of a thin plate, the cooler with the jacket structure becomes a major cause of blocking the thinning of the cell module. In addition, since fittings attached to side faces for the supply and exhaust of cooling water mutually interfere, it is difficult to thin the cooler to the thickness smaller than the size of the fittings.

Therefore, since the thickness of the cooler is dominant over the thickness of the cell module, it is difficult to thin the cell module to the thickness smaller than that of the present cell module.

In addition, the number of stacked layers of the cell module is large, for example, 30. For this reason, it has great influence on the price reduction of a discharge cell for an ozonizer to reduce the manufacturing cost of each module. As for the high voltage electrode $2b$ intervening between the two glass plates $2a$ and $2a$ in the dielectric body unit 2, it is known that cooling becomes unnecessary by thinning. From this viewpoint, the high voltage electrode $2b$ is formed by integrally coating a conductive material over both surfaces of the glass plates $2a$ and $2a$ by metallizing, plating, thermal spraying, or the like.

Owing to this, since a gap is eliminated from between the glass plate $2a$ and high voltage electrode $2b$, a discharge required for generating ozone stably arises in the discharge gap 3. However, on the other hand, since coating cost for forming an electrode increases, this becomes a major factor of increasing the manufacturing cost of each module. In addition, it is also a problem that mechanical and physical secondary abuses arise and leading of a terminal area becomes difficult, by the glass plate $2a$ being heated in the coating process.

In addition, conventionally, this high-voltage electrode $2b$ is formed with coating substantially over the glass plates $2a$ and $2a$, and the depth of the high voltage electrode $2b$ in the fore-and-aft direction is substantially the same as the depth of the low voltage electrodes 1 and 1 with the depth of the glass plates $2a$ and $2a$. Nevertheless, as a recent tendency, the thickness of the glass plate $2a$ has been made thin so as to miniaturize a discharge cell, and the distance between components of the discharge cell is shortened. Hence, it has become impossible to secure the sufficient insulation distance between the high voltage electrode $2b$ and low voltage electrodes 1 and 1. For this reason, since unusual discharges frequently occur between the high voltage electrode $2b$ and low voltage electrodes 1 and 1, the deterioration of reliability of the discharge cell has been a problem.

An object of the present invention is to provide a discharge cell for an ozonizer that can stably secure the minimum discharge gap amount G such as 0.2 mm or less in a mass production level, and can avoid the breakage of a cell component and the upsizing of a pressurizing mechanism (clamping mechanism).

Another object of the present invention is to provide a small and economical discharge cell for an ozonizer where it is easy to exhaust ozone gas in spite of performing gas circulation in a parallel flow.

Still another object of the present invention is to provide a discharge cell for an ozonizer that has a thin cooler without lowering coolability, and makes it possible to drastically enhance performance.

Further another object of the present invention is to provide an economical discharge cell for an ozonizer that can reduce the manufacturing cost of a module, and in particular, electrode formation cost.

Still further another object of the present invention is to provide a discharge cell for an ozonizer with high reliability that does not cause an unusual discharge.

BRIEF SUMMARY OF THE INVENTION

In order to achieve the above-described objects, a discharge cell for an ozonizer according to the present invention comprises a couple of first electrodes constituted by a plate-like rigid body, a rigid body spacer for space formation, arranged between the couple of first electrodes, which forms a space with a gap amount being fixed therebetween, and a dielectric body unit that is composed of a plate-like rigid body constituted with sandwiching a second electrode between a couple of dielectrics and is supported in a neutral position of the above-described space by spacers for discharge gap formation that are arranged in the both sides to form a couple of discharge gaps with the couple of first electrodes.

In the discharge cell for an ozonizer according to the present invention, clamping-pressure for cell assembly is applied only to the rigid body spacers, and the clamping pressure is not directly applied to the dielectric body unit in the space formed by the rigid body spacers. The dielectric body unit is supported in a space thereof by a spacer for discharge gap formation different from the rigid body spacers to form a discharge gap in both sides thereof. The discharge gap amount G is uniquely determined by each thickness of the rigid body spacer made of a rigid body, and a dielectric body unit.

Thus, in the discharge cell for an ozonizer according to the present invention, since the space in which the dielectric body unit is contained is separately formed by the rigid body spacers, it is also possible to stably secure the minimum discharge gap amount G such as 0.2 mm or less in a mass production level. In addition, it is possible to effectively avoid the breakage of a component for the cell and the upsizing of a pressurizing mechanism (clamping mechanism).

As a spacer for discharge gap formation that is arranged at each discharge gap and supports a dielectric body unit in a neutral position in a space, for example, the following two spacers are preferable.

(1) An elastic body spacer that is inserted in at least one position in each discharge gap with being compressed and supports the dielectric body unit in the neutral position in the above-described space with elastically pressing the dielectric body unit from both faces by the compression.

(2) A rigid body spacer that is arranged in at least one position in each discharge gap and has a thickness smaller than $(G'-T)/2$, where $G'$ is a gap amount of the above-described space be $G'$, and T is the thickness of the dielectric body.

When the spacer for discharge gap formation is an elastic body spacer, only the elastic pressure from both faces accompanied by the compression of the elastic body spacer arranged in the discharge gap in both faces is applied to the dielectric body unit in the space formed by the rigid body spacers. The dielectric body unit is supported in the neutral position in the space by this elastic pressure from the both faces. Owing to this, the discharge gap amount G is uniquely determined by each thickness of the rigid body spacers made of rigid bodies, and a dielectric body unit without depending on the elastic body spacer. Since the clamping pressure and supporting pressure are separated by such combination of rigid body spacers and an elastic body spacer, it is possible to stably secure the minimum discharge gap amount G such as 0.2 mm or less in a mass production level, and to effectively avoid the breakage of a component for the cell and the upsizing of a pressurizing mechanism (clamping mechanism).

PFA, PTFE, etc. which are excellent in ozone resistance and have adequate elasticity are preferable as the material of the elastic body spacer. In addition, in the discharge cell for an ozonizer according to the present invention, the elastic body spacer arranged in the discharge gap is exposed not only to ozone but also to a discharge. If the degradation of the elastic body spacer under the influence of a discharge is cared, for example, a portion of the second electrode in a dielectric body unit that corresponds to the elastic body spacer may be cut in a slot and the like. Thereby, discharges in the elastic body spacer are stopped or decreased, and hence it is possible to surely prevent spacer degradation by discharges.

When the spacer for discharge gap formation is a rigid body spacer, assuming that the discharge gap amount of a space is $G'$ and the thickness of a dielectric body unit is T, its thickness is made to be smaller than $(G'-T)/2$, and hence the clamping pressure for a cell assembly is not applied to the dielectric body unit. The dielectric body unit arranged in the space has some play in the thickness direction in design, and although this play makes the discharge gap amounts G and G in both sides unstable, each discharge gap amount G does not become smaller than the thickness of the rigid body spacer. According to an experiment by the present inventor et al., it was confirmed that the instability of the discharge gap amounts G and G does not have a bad influence on generating of ozone so long as the difference between the thickness of the rigid body spacer and (G'−T)/2 is not excessive.

If anything, an exclusive area in the discharge gap decreases by using the rigid body spacer as the spacer for discharge gap formation, and hence ozone-generating efficiency increases. In addition, since metal can be used as its material, very high ozone resistance and discharge resistance can be secured. Furthermore, since it becomes possible to perform the unification to the dielectric body or first electrode, the assembling property of the discharge cell is enhanced.

As a method of unification of the rigid body spacer to the first electrode or dielectric body, there is welding to the first electrode if the rigid body spacer is metal. As the welding method, resistance welding is preferable. Since a rigid body spacer (metal spacer) is crushed in a weld zone in the resistance welding, the weld zone does not protrude toward a dielectric body, and hence it is possible to avoid the situation that the dielectric body is broken at the time of assembling the discharge cell.

As the unification methods other than welding, there are thermal spraying, plating, coating, porcelain enamel, etc. of material the same as or different from that of the dielectric body or first electrode, or depressing of a portion except the spacer that is given by etching, grinding, press working, etc.

Specifically, it is preferable that the thickness of the rigid body spacer for discharge gap formation is 80% or more of the above-described formula, (G'−T)/2. If this is less than 80%, the difference between discharge gap lengths formed in the both sides of the dielectric body unit exceeds 50%, and hence there is a possibility that a bad influence may arise in ozone generation. The upper limit of the thickness is made to be less than the above-described formula (G'−T)/2 so as to avoid the situation that the dielectric body is broken by the spacer.

A problem cared when the rigid body spacer for discharge gap formation, and in particular, a conductive spacer is used is the bad influences on ozone generation by a discharge that takes place around the spacer. But, according to an investigation by the present inventor et al., it became clear that, so long as an exclusive area of the conductive spacer in the discharge gap is 0.5% or less of a discharge area, it is possible to prevent rapid degradation of ozone generating performance due to the use of the conductive spacer (refer to FIG. 7). In addition, the reduction of this exclusive area is effective since a discharge area effective in generating ozone is enlarged without relating to the material of the rigid body spacer. The rigid body spacer supports the dielectric body unit with sufficient precision even if having such small exclusive area in a space, and forms a discharge gap with high dimensional accuracy.

As the material of this rigid body spacer, for example, it is possible to use glass, and ceramics such as alumina besides corrosion-resistant metals such as stainless steel, nickel, tungsten, and titanium.

It is preferable that the discharge gap amount G in the discharge cell for an ozonizer according to the present invention is 0.4 mm or less, and in particular, 0.2 mm or less for high concentration of ozone gas.

As for the geometry of the spacer, arbitrary geometry such as a disk, a belt, and a line is possible. However, what is preferable not only in the case where the spacer for discharge gap formation is a rigid body spacer, but also in the case that the spacer for discharge gap formation is an elastic body spacer is a wire that is arranged in the direction of raw material gas circulation in the discharge gap. If the elastic body spacer is a wire (since it is not a face bar), a discharge area effective in ozone generation increases since the ratio of the area, which the spacer occupies, to the discharge area in the discharge gap becomes small. In addition, a gas flow is rectified because the wire is arranged in the direction of the gas flow, and in consequence, a gas uniformly flows in the discharge part.

Furthermore, as the wire, a wire having a circular cross section is preferable. Although repulsion at the time of starting geometry deformation is weak if the cross section of the wire is circular, repulsion becomes large as geometry deformation progresses. That is, the repulsion becomes large as the gap approaches the discharge gap amount G that is a target. For this reason, it becomes easy to perform elastic support of the dielectric body unit in a neutral position.

It is preferable that the second electrode sandwiched by a couple of dielectric bodies in the dielectric body unit is a high voltage electrode since insulation is easy. It is preferable that the first electrode is a low voltage electrode in relation to this, and it is preferable that the low voltage electrode also serves as a cooler. It is preferable from the viewpoint of the thinning of the cell that thin plate type electrodes that are made by at least two sheets of conductive thin plates being stacked as described later and have a coolant circulation path between at least two sheets of conductive thin plates serve as the electrode that also serves as a cooler.

As for a gas flow, it is preferable to constitute a gas exhaust system where ozone gas is exhausted in the direction perpendicular to the direction of gas circulation from a middle part in the direction of gas circulation within the above-described discharge gap against a raw material gas supplied along both sides of the dielectric body in two opposing directions respectively into the couple of discharge gaps.

Owing to this configuration, the raw material gas is supplied from the two directions opposing each other into the discharge gap to be ozonized. The ozone gas turns to the side direction and/or the thickness direction of the discharge gap in the middle part in the direction of gas circulation within the discharge gap, and is exhausted in at least one direction of the side and/or the upper and lower sides of the discharge gap. For this reason, it becomes unnecessary to take out the ozone gas from front and back faces of the discharge cell.

In order to smoothly exhaust the ozone gas, it is preferable to exhaust the ozone gas to both sides of the discharge gap. In addition, so as to exhaust the ozone gas to the side of the discharge gap in the middle part in the direction of gas circulation within the discharge gap, it is preferable to provide a gas circulation path, which leads the ozone gas to a direction substantially perpendicular to the direction of raw material gas circulation, in the first electrode and/or the dielectric body unit.

It is preferable that the gas circulation path herein has the configuration that the ozone gas exhausted to the side of the discharge gap is exhausted in the thickness direction of the discharge gap from a side edge part. Thereby, the ozone gas can be very easily taken out from an end face in the direction of stacked layers.

The rigid body spacers are usually arranged in both sides of the discharge cell. In both the sides of the discharge cell, the first electrodes and rigid body spacers are stacked by turns, and the dielectric body unit is excluded. Since the first electrodes and rigid body spacers are formed with metal unlike the dielectric body, it is possible to make both the sides be in the stacked structure of metal. Therefore, an ozone gas exhaust path and coolant supply/exhaust paths are very simply formed by using the stacked portion of metal in both the sides.

Although the gas circulation path and a coolant circulation path can be provided in either of the electrode and dielectric body, it is more preferable to provide them in the electrode whose machining and chemical processing is easy.

As for the cooling of the discharge gap, it is preferable from the viewpoint of the miniaturization of the discharge cell to have the configuration in which the first electrode acts for a cooler.

As the cooler, a thin plate type cooler is preferable, the thin plate type cooler where a coolant path is formed between flat-metal plates by stacking the flat metal plates in the direction of plate thickness. According to this configuration, the cooler is drastically thinned and the thickness of 2 mm or less also becomes possible. In consequence, the discharge cell is remarkably thinned.

From the viewpoint of thinning, the thinner the thin plate type cooler is, the better it is, and the thickness of 5 mm or less is preferable, and in particular, the thickness of 2 mm or less is preferable. As for the minimum thickness, since extreme thickness reduction causes the reduction of rigidity at the time of assembly and lowers assembly property, the minimum thickness of 0.5 mm or more is preferable. With letting thickness of the cooler be T, the preferable depth of the coolant path formed in a cooler is (0.2 to 0.8)×T. If the coolant path is deep, processing cost increases, and if too shallow, pressure loss in the path becomes a problem.

As the material of the metal plate which constitutes the cooler, stainless steel, an aluminum alloy, a titanium alloy, etc. that are excellent in corrosion resistance are preferable.

As methods of forming a coolant path between the metal plates which are stacked, there are a method of forming a groove at least one of faces opposing each other in the case of stacking two sheets of metal plates, a method of forming a coolant path between metal plates at both end parts with a middle metal plate as a gasket-like spacer in the case of stacking three sheets of metal plates, and the like. As the methods of forming a groove in an opposing face, there are a chemical method represented by etching, and a mechanical method represented by grinding and forging. What is most preferable is the etching that can form a shallow and wide groove with high precision and simplicity. The gasket-like spacer is producible by, for example, punching.

It is preferable that the coolant circulation path in the cooler has the configuration that the coolant is circulated along an electrode surface in a direction perpendicular to the direction of raw material gas circulation, and is circulated in the thickness direction of the discharge gap at the end parts. Further specifically, it is preferable that the coolant circulation path has the configuration that the coolant circulation path is connected to a coolant feeding-in path and a coolant feeding-out path in the thickness direction formed in the rigid body spacer at the end parts. Thereby, the coolant can be very easily supplied to/drained from the end faces in the direction of stacked layers. In addition, thinning becomes still easier by avoiding the interaction of fittings between adjoining coolers by eliminating fittings from the sides of the cooler.

As for the dielectric body, it is preferable to form the second electrode, arranged between a couple of dielectric bodies, with a conductive thin plate.

Thereby, the manufacturing cost of the dielectric body unit becomes very low. In addition, the thin plate has high flatness since being supported between the couple of dielectric bodies having high stiffness, and depending on material (for example, stainless steel), the thin plate itself has high flatness to enable a stable discharge in the discharge gap. Furthermore, a flexible terminal area that is easy to be treated is simply formed by drawing a part of its edge in a beltlike shape out of the edge from between the couple of dielectric bodies.

It is preferable that the thickness of the thin plate is 200 µm or less. Since the stiffness of the thin plate becomes high if the thickness exceeds 200 µm, there is a possibility of generating a mechanical damage such as a crack in the dielectric body in assembly operation etc. As for its minimum limit, it is preferable from the view point of the deterioration of workability at the time of assembly that the thickness is 10 µm or more. As for the material of the thin plate, metal such as stainless steel, a nickel alloy, an aluminum alloy, or a copper alloy is suitable, and among them, stainless steel is preferable from the viewpoint of corrosion resistance or availability of material especially. Since a metal thin plate is usually manufactured by rolling, the rolled stock is preferable from the viewpoint that flatness and stiffness by work hardening are expectable, and material that is just rolled without annealing after rolling is especially preferable from the viewpoint that the stiffness by work hardening and the flatness thereby can be utilized. A stainless steel thin plate just rolled is especially preferable.

As the dielectric body, a glass plate, and in particular, a glass plate having the following composition is preferable from the viewpoint of low cost, voltage endurance characteristics, dimensional accuracy, mirror plane property of a surface without polishing, and the like, but it is possible to use a ceramic plate such as alumina, a crystal plate such as sapphire, a ceramic-coated plate by thermal spraying such as alumina, a porcelain enamel plate, and the like.

The preferable composition of the glass plate is $SiO$: 40-70%, $Al_2O_3$: 5-30%, $B_2O_3$: 0-20%, $MgO$: 0-5%, $Cao$: 0-10%, $SrO$: 0-8%, $BaO$: 0-20%, and $ZnO$: 0-1%. A glass plate with this composition is mainly used for a glass substrate for a liquid crystal display, has advantages such as high flatness, and few internal defects such as air bubbles, which are excellent as a dielectric body for an ozonizer, and is also easy-to-get. The glass plate with this composition is effective regardless of the structure of the discharge cell.

It is preferable that the thickness of the glass plate is 0.3 to 1.5 mm. If the glass plate is thick, the voltage drop in the glass plate becomes large, and hence a supply voltage to the discharge cell becomes high. If thin, workability at the time of assembly falls, or breakage by the shortage of mechanical strength etc. arises.

The terminal area which is formed in a beltlike shape by drawing a part of an edge of the thin plate from between the couple of dielectric bodies is not only easy to be formed, but also rich in the flexibility in the direction of plate thickness, and when modules are stacked in the direction of plate thickness, it is possible to simply stack terminal areas between respective modules. In addition, it is possible to simply form a fuse part in one piece by making width small in a part of the terminal area in the longitudinal direction.

The width of the terminal area may be adequately selected within the range of the width of the thin plate.

In addition, since this terminal area is a thin plate and thermal diffusion is small, there is a possibility that fusing may arise by heat if an unusual discharge arises in the terminal area. For this reason, it is good to attach a heat radiation-promoting member in the terminal area.

In addition, as for the relation of the couple of dielectric bodies and the second electrode in the dielectric body unit, it is preferable to make the couple of dielectric bodies larger than the second electrode and to make the edge protrude outside the edge of the second electrode in the substantially entire circumference of the couple of dielectric bodies.

Owing to this protrusion, an unusual discharge with the edge of the second electrode as a starting point is effectively suppressed.

The preferable protrusion amount of edges of the dielectric bodies is 2 to 70 mm. If this protrusion amount is less than 2 mm, the effect of suppressing an unusual discharge is small. If exceeding 70 mm, the dielectric bodies become large, and hence the upsizing and cost increase of the discharge cell arise. The especially preferable protrusion amount is 5 to 50 mm.

The couple of dielectric bodies can be joined with sandwiching the second electrode. Owing to this junction, since the dielectric body and electrode can completely contact with each other, it is possible to prevent an unnecessary discharge generated in a gap between the dielectric body and electrode.

As the junction method, for example, thermal welding by polyimide, PFA, and FEP, and adhesion by a silicon resin and an epoxy resin can be used. Although the thermal welding by polyimide, PFA, and FEP is preferable when ozone concentration is high, it is preferable to join a couple of dielectric bodies in at least a part outside an edge of the second electrode so as to reduce the stress of the dielectric bodies. In this case, it becomes possible to use inorganic-based adhesive material such as glass sealing material whose expansion coefficient is similar to that of the dielectric body.

When joining a couple of dielectric bodies outside the edge of the electrode, it is preferable to separate the joint from the second electrode therein. Thereby, insulation in the circumference of the second electrode improves and an unusual discharge is suppressed. Here, the preferable gap is 1 to 10 mm. If it is less than 1 mm, the improvement effect of the insulation is small, and a problem of interference between the electrode and joint arises. If it exceeds 10 mm, a crack may arise in the dielectric body.

In the discharge cell for an ozonizer according to the present invention, by stacking a plurality of modules in the direction of plate thickness with letting a first electrode, a rigid body spacer, and a dielectric body unit be one module, a module-stacked body is constituted.

In that case, it is preferable that, with letting the first electrode be a coolant circulation type cooler, a manifold way for coolant supply and a manifold way for coolant exhaust that are shared between respective coolers are formed in the above-described module-stacked body.

Thereby, piping joint members are eliminated from each cooler. In addition, a complicated external piping system formed by combining many branch pipes is eliminated from an apparatus. Owing to this, apparatus size is sharply reduced in the module-stacked direction, and the direction perpendicular to this.

It becomes possible to further miniaturize the apparatus by forming a manifold way for ozone gas, which is shared between respective modules, in the above-described module-stacked body so as to exhaust the ozone gas, which is generated in the discharge gap of each module, outside the apparatus.

It is preferable from the view point of the miniaturization of the apparatus to form the manifold way in the module-stacked direction.

In this case, it is preferable from the viewpoint of apparatus miniaturization to make a plurality of manifold ways open toward end faces having the same module-stacked direction.

In addition, it is preferable from the view point of parts count reduction to perform sealing between stacked members for path configuration in the manifold ways for coolant supply and for coolant exhaust, and not to perform sealing between stacked members for path configuration in the manifold ways for the ozone gas.

In the manifold way for the ozone gas, even if the sealing between stacked members for path configuration is not performed since pressure difference between pressures inside and outside the path is small, there is no leakage of the ozone gas substantially, and hence, a parts count can be reduced owing to the non sealing.

As for the joint members, it is preferable to fix the module-stacked body by end plates arranged at both end parts in the module-stacked direction, and to directly connect with each manifold way each piping joint member for connecting with external piping the manifold ways for coolant supply and for coolant exhaust, which are formed in the module-stacked direction of the module-stacked body, with making the piping joint member penetrate the above-described end plate in the direction of plate thickness of the endplate. Owing to this, since the situation that the coolant contacts the end plates is avoided, it becomes unnecessary to consider the corrosion of the end plates caused by the coolant, and hence a selection range of material thereof spreads, and it becomes possible to reduce weight thereof.

In both the sides of the module-stacked body, the first electrodes and rigid body spacers are stacked by turns, and the dielectric body unit is excluded. Since the first electrode and rigid body spacer are formed with metal unlike the dielectric body, it is possible to make both the sides be in the stacked structure of metal. Therefore, a manifold way is very simply formed by using the stacked portions of the metal in both the sides.

As an ozonizer which uses the discharge cell for an ozonizer according to the present invention, it is preferable the ozonizer has the configuration that a plurality of discharge cells is contained in the same tank, the same kind of manifold ways, which are formed in a module-stacked body of each discharge cell are interconnected by a manifold in the above-described tank, and a part of connecting piping thereof is drawn out from the tank.

Owing to this configuration, in spite of containing the plurality of discharge cells in the same tank, the piping system in the tank is simplified.

BRIEF DESCRIPTION OF THE DRAWINGS

FIG. 3 is an exploded perspective view showing the structure of a first electrode used in the cell module;

FIG. 6 is a vertical sectional front view of a dielectric body unit used in the cell module;

FIG. 9 is an exploded perspective view of a first electrode used in the cell module;

FIG. 14A is a sectional view that is taken by line A-A in FIG. 12 and shows an upper end plate portion, and FIG. 14B is a sectional view that is taken by line B-B in FIG. 12 and shows an upper end plate portion;

DETAILED DESCRIPTION OF THE PREFERRED EMBODIMENTS

Hereinafter, embodiments of the present invention will be described on the basis of drawings.

FIGS. 1 to 4 show an embodiment of the present invention.

Figure 1:
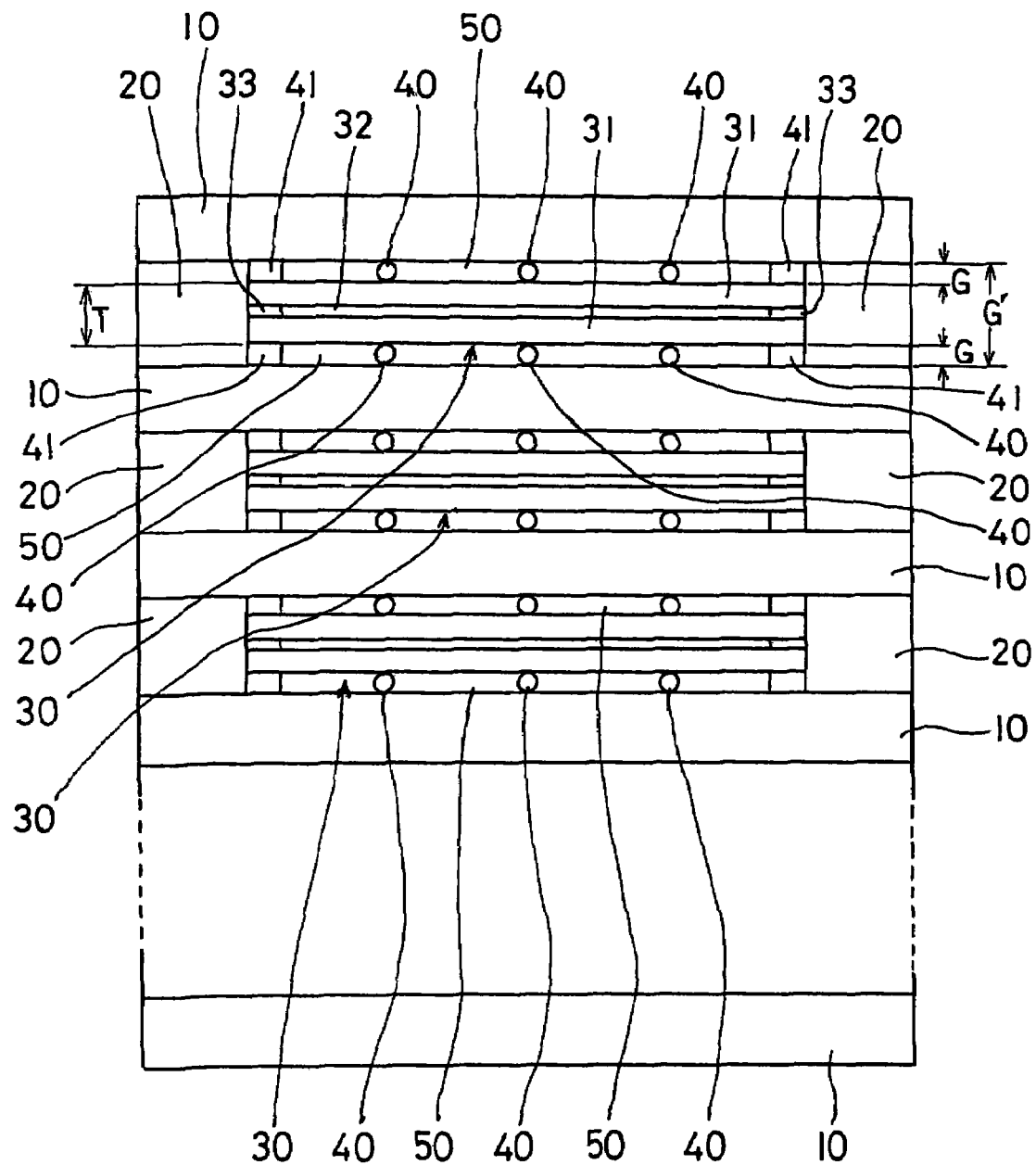
FIG. 1 is a front view of a discharge cell for a plate type ozonizer according to an embodiment of the present invention.

As shown in FIG. 1, a discharge cell according to this embodiment constitutes a stacked body of cell modules by stacking a plurality of first electrodes 10, 10, . . . , constituting of plate-like rigid bodies, in the direction of plate thickness with sandwiching a couple of rigid body spacers 20 and 20 in both sides. The stacked body of cell modules is fixed between a couple of upper and lower end plates, not shown, with two or more bolts which penetrate both sides in the module-stacked direction. In this stacked body, the upper and lower cell modules share the first electrode 10.

Figure 2:
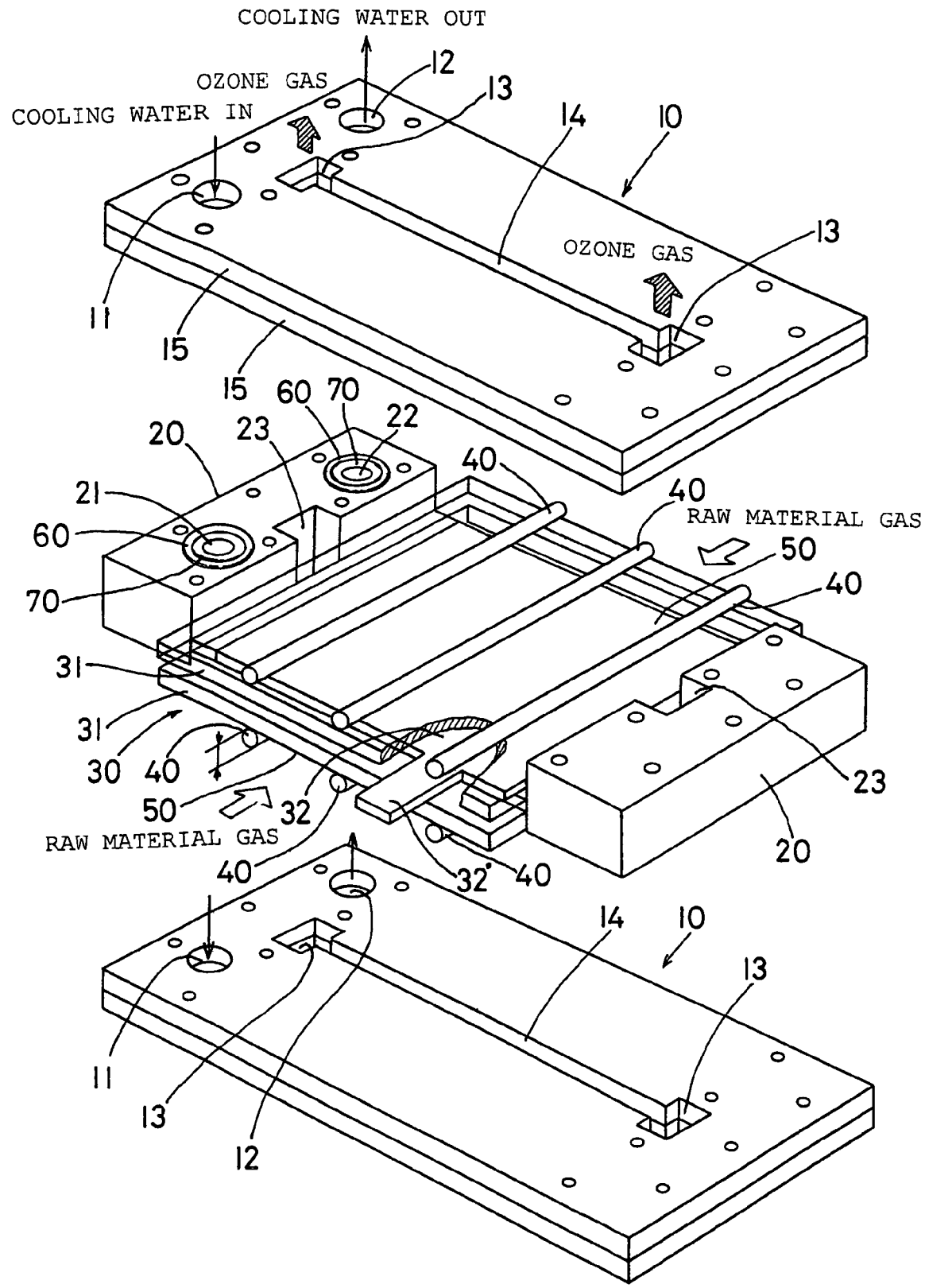
FIG. 2 is an exploded perspective view showing the structure of a cell module of the discharge cell.

As shown in FIG. 2, each cell module comprises a couple of upper and lower first electrodes 10 and 10, a couple of rigid body spacers 20 and 20 in both sides that is sandwiched by the couple of first electrodes 10 and 10, a dielectric body unit 30 which is located inside the couple of rigid body spacers 20 and 20, and are arranged between the couple of first electrodes 10 and 10, and a plurality of elastic body spacers 40, 40, . . . for discharge gap formation provided between the couple of first electrodes 10 and 10 so as to form discharge gaps 50 and 50 in both sides of the dielectric body unit 30.

In addition, although each drawing is exaggerated in the size in the vertical direction, the actual thickness is designed to be thin. For example, the actual thickness of the first electrode 10 is 3 mm or less, and that of the rigid body spacer 20 is 3 mm or less.

The couple of upper and lower first electrodes 10 and 10 is a low voltage electrode which serves as a heat sink. Each first electrode 10 is a conductive thin plate-like rigid body formed by forming a coolant circulation path between two conductive plates 15 and 15 after joining the two conductive plates made of stainless steel sheets etc.

In one side of the first electrode 10, a coolant feeding-in hole 11 for introducing the cooling water as a coolant into a coolant circulation path, and a coolant feeding-out hole 12 for exhausting the cooling water from the above-described circulation path are provided with penetrating two conductive plates 15 and 15 in the direction of plate thickness. In addition, in order to exhaust the ozone gas generated in the cell module concerned, a couple of gas feeding-out holes 13 and 13 in both sides, and a slit-like gas feeding-out path 14 connecting the gas feeding-out holes 13 and 13 are provided in the first electrode 10 with penetrating two conductive plates 15 and 15 in the direction of plate thickness. A plurality of small round holes provided in the both sides of the first electrode 10 is through holes for bolts.

In the opposing faces of both the conductive plates 15 and 15 constituting the first electrode 10, as shown in FIG. 3, large U-shaped shallow grooves are formed so that the grooves may surround the gas feeding-out holes 13 and 13 and the gas feeding-out path 14. These grooves formed in both opposing faces are united to form a coolant circulation path 16 between the conductive plates 15 and 15. These shallow large grooves are simply formed by etching etc.

One end part of the coolant circulation path 16 is connected to the coolant feeding-in hole 11, and another end part is connected to the coolant feeding-out hole 12. In the coolant circulation path 16, a plurality of ribs 17, 17, . . . extending in the circulation direction is provided in the direction perpendicular to the circulation direction in predetermined intervals. The ribs 17, 17, . . . contribute to the uniform flow of cooling water, and the maintenance of the stiffness of the first electrode 10.

The couple of rigid body spacers 20 and 20 in both sides is thin plate-like conductive rigid bodies made of conductive plates such as stainless steel sheets, and forms a space with a discharge gap amount G' equal to spacer thickness during this time by intervening in both sides between the first electrodes 10 and 10. In addition, the couple of rigid body spacers 20 and 20 functions as electric connection members of the first electrodes 10 and 10.

In one rigid body spacer 20, a coolant feeding-in hole 21 and a coolant feeding-out path 22 communicating with the coolant feeding-in hole 11 and coolant feeding-out hole 12 of the first electrode 10 respectively are provided with penetrating in the direction of plate thickness. A notch-like gas feeding-out hole 23 communicating with the gas feeding-out hole 13 of the first electrode 10 is provided in each inside edge of both the rigid body spacers 20 and 20 with penetrating in the direction of plate thickness. In addition, through holes for bolts are also provided like the first electrode 10.

Figure 4:
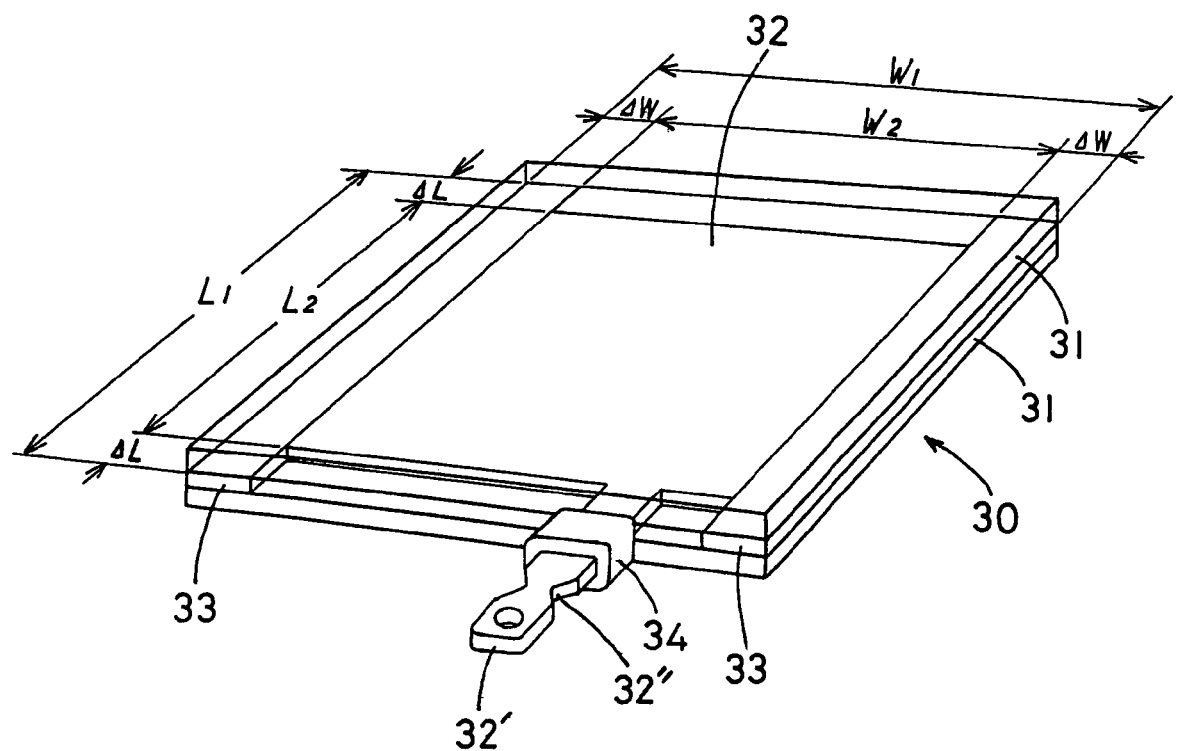
FIG. 4 is a perspective view of a dielectric body unit used in the cell module.

As shown in FIG. 4, the dielectric body unit 30 arranged in a space surrounded by the couple of upper and lower first electrodes 10 and 10 and the couple of rigid body spacers 20 and 20 in both sides is a thin plate-like rigid body having the sandwich structure of sandwiching the second electrode 32 and insulating-spacers 33 and 33 in both sides between a couple of upper and lower glass plates 31 and 31 as dielectric bodies. The thickness T of the dielectric body unit 30 is slightly less than the discharge gap amount G' of the above-described space, and more specifically, with letting each discharge gap amount of the discharge gaps 50 and 50 be G, the thickness T is made to be G'−2G.

The second electrode 32 is a high voltage electrode, made of a conductive thin plate such as a stainless steel sheet, and its adequate thickness is 200 μm or less. The width W2 of the second electrode 32 is set to be narrower than the width W1 of the glass plates 31 and 31, and hence, both side edges of the second electrode 32 are recessed by ΔW and ΔW respectively from both side edges of the glass plates 31 and 31 to the inside. The adequate width difference ΔW is 2 to 70 mm. The length L2 of the second electrode 32 is set to be shorter than the length L1 of the glass plates 31 and 31, and hence, both front and back edges of the second electrode 32 are recessed by ΔL and ΔL respectively from both front and back edges of the glass plates 31 and 31 to the inside. The adequate length difference ΔL is also 2 to 70 mm.

In addition, the length L2 of the second electrode 32 is set to be larger than the length of the couple of upper and lower first electrodes 10 and 10, and hence, both front and back edges of the second electrode 32 protrude back and forth from both front and back edges of the glass plates 31 and 31. The adequate protruding amount is 2 to 20 mm.

That is, the length of each member in a cell module becomes large in order of the first electrodes 10 and 10, second electrode 32, and glass plates 31 and 31, and the length of rigid body spacers 20 and 20 is the same as the length of the first electrodes 10 and 10.

A part of the front edge of the second electrode 32 protrudes from between the glass plates 31 and 31 in a belt-like shape to the front as a terminal area 32'. In the terminal area 32', while a heat radiation promoting part 34 formed by wrapping aluminum foil is attached, a fuse part 32" located in front of the heat radiation promoting part 34 is formed in one piece. The fuse part 32" is formed by making the width of the terminal area 32' partially small in the longitudinal direction.

The elastic body spacers 40, 40, . . . for discharge gap formation provided between the first electrode 10 and 10 so as to form the discharge gaps 50 and 50 in both sides of the dielectric body unit 30 are thin resin wires having ozone resistance and elasticity and having each round cross section, and are arranged in predetermined intervals in the width direction (direction perpendicular to the direction of gas circulation) of the discharge gap 50. The thickness of each elastic body spacer 40 (the outer diameter of a wire: D) is set at the thickness larger by 5 to 50% than each discharge gap amount G of the discharge gaps 50 and 50 in the no-compression status.

Owing to this setting, the elastic body spacers 40, 40, . . . are compressed by the first electrode 10 and dielectric body unit 30 from the upper and lower sides, and owing to this compression, the dielectric body unit 30 is elastically pressed by equal pressure from the upper and lower sides to be supported in a central part of the above-described space in the vertical direction. Inconsequence, the discharge gaps 50 and 50 having uniform discharge gap amounts G are formed in both sides of the dielectric body unit 30.

In addition, tape-like insulating members 41 and 41 that act for elastic body spacers and sealing members and are made of elastic bodies are provided in both sides of each discharge gap 50.

Next, an assembly method, an operation method, and functions of the discharge cell according to this embodiment will be described.

In the assembly of the discharge cell, the plural sheet of first electrodes 10, 10, . . . are stacked with sandwiching the rigid body spacers 20 and 20, dielectric body unit 30, and elastic body spacers 40, 40, . . . between the upper and lower end plates not shown, and are clamped in both sides in the stacked direction with two or more bolts not shown.

Owing to this, the discharge gaps 50 and 50 are formed in both sides of the dielectric body unit 30 in each cell module. Here, the upper and lower first electrodes 10 and 10, rigid body spacers 20 and 20 in both sides, and dielectric body unit 30 are rigid bodies which are not compressed, and on the other hand, the elastic body spacers 40, 40, . . . are compressed, and hence the discharge gap amount G of each discharge gap 50 becomes a constant value, that is, (G'−T)/2. Therefore, it is possible to stably realize a minute charge gap amount G that is 0.2 mm or less.

In addition, the clamping is performed in both sides where the rigid body spacers 20 and 20 are arranged, and since it is not necessary to pressurize the whole discharge cell equally, a clamping mechanism is simplified. Furthermore, there arises no breakage of the elastic body spacers 40, 40, . . . and also no breakage of the glass plates 31 and 31 in the dielectric body unit 30 by the clamping.

The discharge cell that is completely assembled is contained in a tank, which is not shown, so as to feed in a raw material gas from the front and back in the discharge gaps 50 and 50 of each cell module.

In the discharge cell, the manifold way for coolant supply that is continued in the module-stacked direction is formed by aligning the coolant feeding-in hole 11 of the first electrode 10 and the coolant feeding-in hole 21 of the rigid body spacer 20. In addition, the manifold way for coolant exhaust that is continued in the module-stacked direction is formed by aligning the coolant feeding-out hole 12 of the first electrode 10 and the coolant feeding-in hole 22 of the rigid body spacer 20. In addition, a couple of manifold ways for ozone gas exhaust in both sides which is continued in the module-stacked direction is formed by aligning the gas feeding-out holes 13 and 13 of the first electrode 10 and the gas feeding-out holes 23 and 23 of the rigid body spacers 20 and 20.

These ways are communicating with the external of the tank by openings, which are provided in the upper end plate, and a pipe connected to each opening. On the other hand, the lower end plate functions as a cover plate that closes these ways.

When generating ozone, a raw material gas is supplied in the tank that contains the discharge cell. In addition, cooling water is supplied to a coolant feeding-in path. In this status, a high voltage is applied to the second electrode 32 provided in the dielectric body unit 30 of each cell module, and a silent discharge is generated in the discharge gaps 50 and 50.

The raw material gas supplied in the tank flows from the front and back into the upper and lower discharge gaps 50 and 50 in each cell module, and becomes ozone gas by being exposed to a discharge in process of flowing toward a central part in the fore-and-aft direction. The ozone gas generated in the discharge gaps 50 and 50 reaches gas feeding-out holes 13 and 13 through the gas exhaust paths 14 and 14 provided in the upper and lower first electrodes 10 and 10, and is taken out above the discharge cell through a couple of ozone gas exhaust paths in both sides that is formed in both sides of the discharge cell to be further taken out from the tank.

In a manifold way for ozone gas exhaust, a part between the first electrode 10 and rigid body spacer 20 which constitute this is not sealed. However, pressure difference between the inside of the tank and the inside of the discharge gaps 50 and 50 is very small since corresponding to only the pressure loss within the discharge gaps 50 and 50. For this reason, in spite of non sealing, gas leakage to become a problem is not generated, and hence a parts count decreases owing to the non sealing structure.

The cooling water supplied to the vertical manifold way for coolant supply enters into the coolant circulation path 16 from the coolant feeding-in holes 11 and 11 provided in the upper and lower first electrodes 10 and 10 of each cell module to water-cool the discharge gaps 50 and 50 from a low voltage electrode side. The cooling water coming out from the coolant feeding-out paths 12 and 12 of the first electrode 10 and 10 is taken out above the discharge cell through the vertical manifold way for coolant exhaust that is formed in one side of the discharge cell to be further taken out from the tank.

Since a part between components is sealed by a sealing member 70 in the manifold way for coolant supply and the manifold way for coolant exhaust, there is no risk of water leak. In addition, since the sealing member 70 is supported from the inside by a backup member 80, the sealing property of the manifold way for coolant supply is secured even if a high-pressure raw material gas whose pressure is higher than water pressure is supplied in the tank.

The first electrodes 10 and 10 which serve as a heat sink, i.e., a cooler are thin plate type electrodes formed by joining two conductive plates 15 and 15 made of flat thin plates. The dielectric body unit 30 that forms the discharge gaps 50 and 50 with the first electrodes 10 and 10 is also a plate-like unit. Without being performed from a side of each first electrode 10, this supply and exhaust of cooling water is performed from the direction perpendicular to the coolant circulation path 16 between the conductive plates 15 and 15 through the coolant feeding-in hole 11 and coolant feeding-out hole 12 which are provided in the side, and hence, there is no interference of fittings between the adjoining first electrodes 10 and 10. For these reasons, a cell module is thinned, a discharge cell is miniaturized in the case of the same performance, and the performance of a discharge cell is enhanced in the case of the same scale.

Since cooling the discharge gap 50 entirely from a low voltage electrode side, each first electrode 10 is excellent in cooling power.

Since the second electrode 32 (high voltage electrode) in the dielectric body unit 30 is made not to be cooled, its thickness becomes thinner, and hence, this also contributes to thinning of the cell module. If the discharge gap amount of the discharge gap 50 is restricted to 0.5 mm or less, and preferably, 0.2 mm or less even if the second electrode 32 is not cooled, the discharge gap 50 is efficiently cooled even if cooling is performed only from a grounding electrode side, and hence, degradation of ozone generating efficiency is suppressed.

Since the dielectric body in a low voltage electrode side is omitted, thinning of the cell module is further promoted.

Since the dielectric body unit 30 in each cell module needs neither thermal spraying nor plating for formation of the second electrode 32 in its production and the glass plates 31 and 31 can be also easily joined by thermal welding, its production is easy, which contributes to the cost reduction of the discharge cell.

In each dielectric body unit 30, the front and back edges of the second electrode 32 protrude back and forth from the front and back edges of the upper and lower first electrodes 10 and 10. For this reason, since the electric field concentration between respective edges is relaxed, the dielectric breakdown of a dielectric body can be prevented. In addition, the front and back edges of the upper and lower glass plates 31 and 31 further protrude back and forth than the front and back edges of the second electrode 32. For this reason, the distance in which dielectric breakdown is not generated between the first electrodes 10 and 10 and the second electrode 32 can be secured.

In the width direction of the dielectric body unit 30, gaps are secured between the second electrode 32 and the rigid body spacers 20 and 20 in both sides, and the insulating spacers 33 and 33 are arranged in each gap. For this reason, an electric insulation can be obtained between the second electrode 32, and the first electrodes 10 and 10 or rigid body spacers 20 and 20.

The terminal area 32' of the second electrode 32 freely bends in the direction of plate thickness, i.e., the module-stacked direction. Hence, it is possible to simply stack and mutually connect respective terminal area 32' between a plurality of modules which are stacked.

Since the heat radiation-promoting part 34 is attached in each terminal area 32', the thermal diffusion property becomes good, and hence, it is possible to prevent fusing caused by heat generated by an unusual discharge to the terminal area 32'. In addition, since the fuse part 32" is formed in one piece, a fuse tube becomes unnecessary.

Next, a gas flow in the discharge gap 50 will be described. The conventional gas flow in the discharge gap 50 is one-way traffic whose direction is from one end of the discharge gap 50 to another edge. In this case, it is necessary to attach a header in an end face perpendicular to the module-stacked direction of the discharge cell in order to take out ozone gas. However, since an end face of each member that is stacked appears, the end face perpendicular to the module-stacked direction of the discharge cell is not flat. For this reason, sealing between the header and end face becomes difficult.

Against this, in the discharge cell according to this embodiment, a gas feeding-out path 14 is provided in a part contacting to the discharge gap 50 of the first electrode 10 with being located in a central part in the direction of gas circulation in the discharge gap 50, and gas feeding-out holes 13 and 13 connected to the gas feeding-out path 14 are provided in a part contacting to the rigid body spacers 20 and 20 of the first electrode 10. In addition, with corresponding to gas feeding-out holes 13 and 13, gas feeding-out holes 23 and 23 are provided in the rigid body spacers 20 and 20.

In consequence, a raw material gas flows in from one end and another of the discharge gap 50. Both inflow gases are ozonized in the discharge gap 50, enter into the gas feeding-out path 14 of the first electrode 10 in the central part of the discharge gap 50, flow from the gas feeding-out holes 13 and 13 in both sides in the module-stacked direction, and are taken out in the outside of the discharge cell. Hence, the ozone gas is taken out by two pipes from a surface of the first electrode 10, or a surface of the end plate. Unlike the above-described end face, these surfaces are flat, are easy in sealing, and also do not need the header. In addition, since the circulation direction of cooling water and the direction of taking-out of the ozone gas become the same, piping structure becomes simple, and hence the miniaturization of the apparatus is attained.

If a space is formed with a spacer between a couple of the first electrodes, the dielectric body unit is arranged in this space, and discharge gaps are formed in both sides thereof, this gas taking-out structure can be applied also to discharge cells other than the discharge cell according to the present invention.

Figure 5:
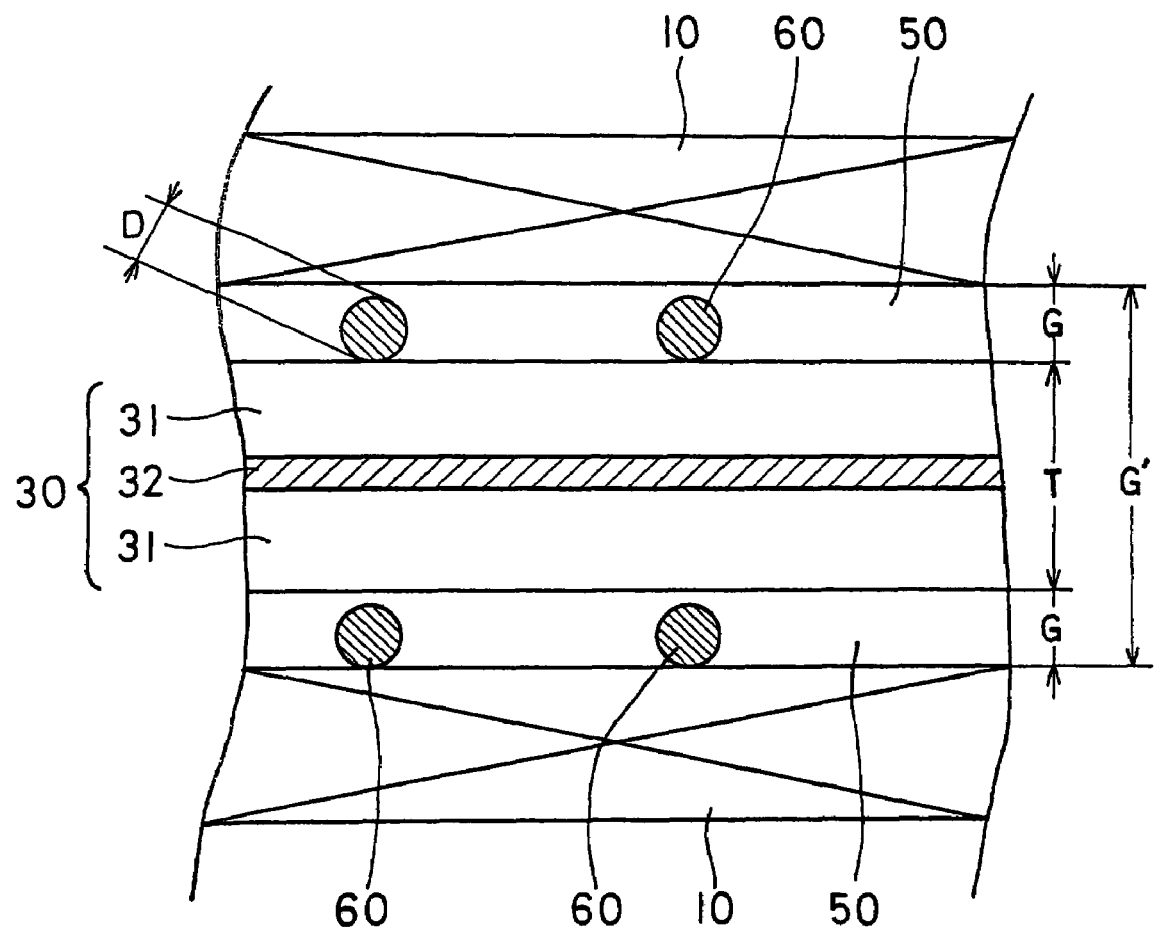
FIG. 5 is a partially enlarged front view of a discharge cell for a plate type ozonizer according to another embodiment of the present invention.
Figure 7:
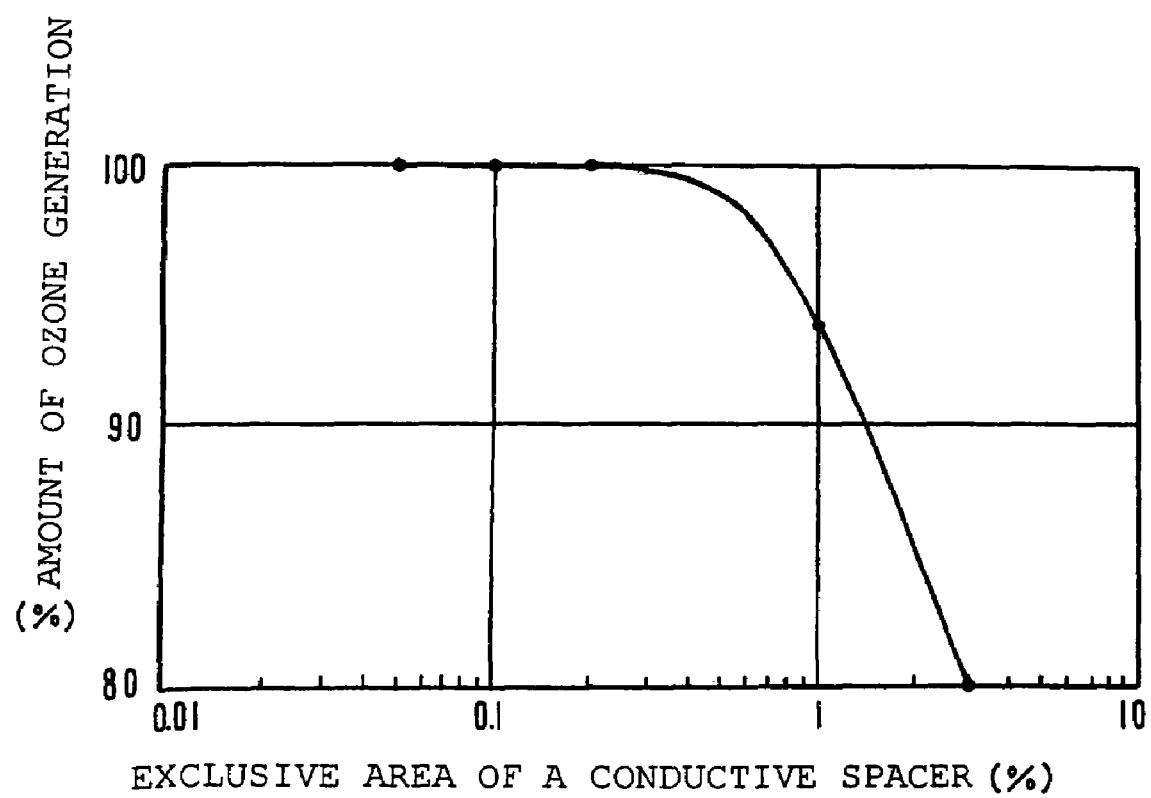
FIG. 7 is a graph showing the relation between the exclusive area of a conductive spacer and the amount of ozone generation.

FIGS. 5 to 6 show another embodiment of the present invention.

In comparison with the above-mentioned discharge cell for an ozonizer, a discharge cell for an ozonizer according to this embodiment is different in the following points.

That is, the different points are a point that rigid body spacers 60, 60, . . . are used instead of the elastic body spacers 40, 40, . . . as spacers for discharge gap formation, and a point that glass plates 31 and 31 are joined so as to integrate the dielectric body unit 30. Since other configurations are the same as the above-mentioned discharge cell for an ozonizer, detailed explanation will be omitted.

In order to form the discharge gaps 50 and 50 in both sides of the dielectric body unit 30, the rigid body spacers 60, 60, . . . for discharge gap formation are provided between the first electrodes 10 and 10. The rigid body spacers 60, 60, . . . are thin metal wires that are made of stainless steel and have each round cross section, and are arranged in predetermined intervals in the width direction (direction perpendicular to the direction of gas circulation) of the discharge gap 50. Each rigid body spacer 60 is fixed to a surface of the first electrode 10 by resistance welding in two or more places in the longitudinal direction. The thickness of each rigid body spacer 60 (outer diameter of a wire: D) is set to be slightly smaller than each regular discharge gap amount G of the discharge gaps 50 and 50 that is calculated by (G'−T)/2 derived from the discharge gap amount G' of the space, determined by the rigid body spacers 20 and 20, and the thickness T of the dielectric body unit 30.

Owing to this setting, the dielectric body unit 30 is contained in a space, formed between the first electrodes 10 and 10 by the rigid body spacers 20 and 20, with a slight clearance in the thickness direction. For the avoidance of decomposition of the dielectric body unit 30 owing to this clearance, the prevention of an unnecessary discharge generated in the clearance between the dielectric body and electrodes in a unit, and the like, as shown in FIGS. 6A to 6C, the dielectric body unit 30 is integrated by joining the glass plates 31 and 31.

That is, in FIG. 6A, the glass plates 31 and 31 are joined and integrated by upper and lower adhesive layers 35 and 35 with sandwiching the second electrode 32 and the insulating spacers 33 and 33 arranged in both sides thereof. The insulating spacers 33 and 33 have the same thickness as the second electrode 32. The adhesive layers 35 and 35 are thermally welded layers of polyimide, PFA, FEP, and the like which have ozone resistance. That is, the glass plates 31 and 31 are integrated with the second electrode 32 and insulating spacers 33 and 33, which are located therein, by thermal welding using an ozone-resistive resin such as a polyimide, PFA, and FEP.

In addition, in FIGS. 6B and 6C, the glass plates 31 and 31 are partially joined by the thermal welding only in both sides of the second electrode 32. In this case, since the adhesive layers 35 and 35 which are joints are excluded to the sides of the second electrode 32, not only the thickness of the dielectric body unit 30 decreases, but also the adhesive layers 35 and 35 function as insulating spacers in both sides. As for the adhesive layers 35 and 35 in both sides, as shown in FIG. 6C, gaps 36 and 36 can be provided between the second electrode 32 and adhesive layers 35 and 35 in both sides. Owing to this, since insulated spaces are made between the adhesive layers 35 and 35, it is possible to prevent insulation breakdown by a tree discharge generated in the adhesive layers 35 and 35.

Substantially similarly to the above-mentioned discharge cell for an ozonizer, in the discharge cell for an ozonizer according to this embodiment, since it is not necessary to pressurize the whole discharge cell equally because clamping is performed in both sides in which the rigid body spacers 20 and 20 are arranged, not only a clamping mechanism is simplified, but also the breakage of the glass plates 31 and 31 in the dielectric body unit 30 by clamping is prevented. Furthermore, the minute discharge gap amount G of 0.2 mm or less is realized stably.

Figure 8:
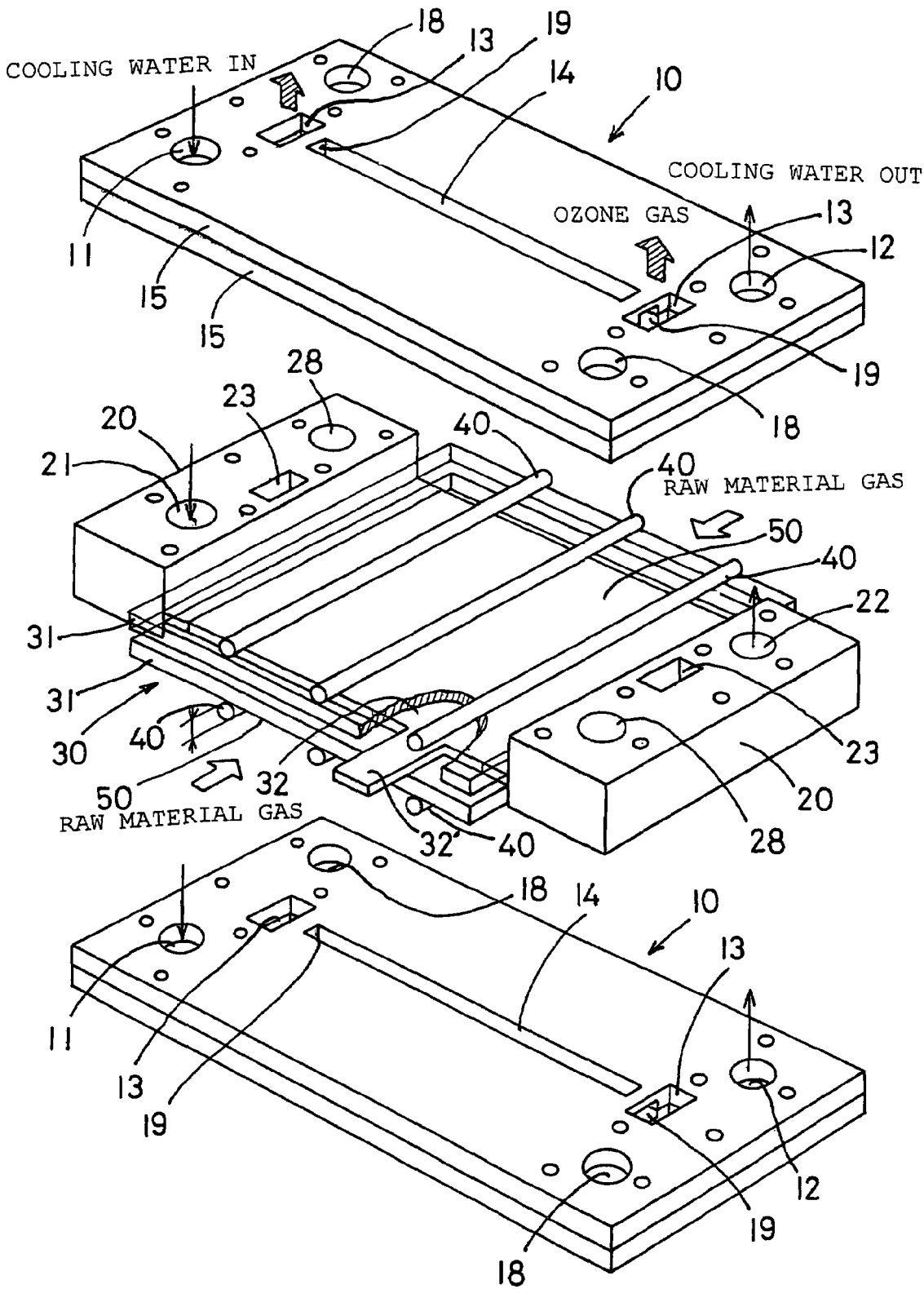
FIG. 8 is an exploded perspective view of a cell module of a discharge cell for a plate type ozonizer according to still another embodiment of the present invention.

FIGS. 8 to 9 show still another embodiment of the present invention.

In a discharge cell for an ozonizer according to this embodiment, the structure of the first electrodes 10 and 10 and the structure of rigid body spacers 20 and 20 in each module are different in comparison with the above-described discharge cell for an ozonizer. Although such structures will be described below, other structures are substantially the same, and hence, the same reference numerals will be given to the same parts, and the description on them will be omitted. In one side of each first electrode 10, a coolant supply hole 11 for supplying cooling water as a coolant to a coolant circulation path and a coolant reserving hole 18 for temporarily reserving some cooling water are provided with penetrating two conductive plates 15 and 15 in the direction of plate thickness. In another side, a coolant reserving hole 18 for temporarily reserving some cooling water and a coolant exhaust hole 12 for taking out cooling water from the above-described circulation path are provided with penetrating the two conductive plates 15 and 15 in the direction of plate thickness.

In addition, in order to take out the ozone gas generated in the cell module concerned, a couple of gas feeding-out holes 13 and 13 in both sides that are separated from a gas circulation path 14, and the slit-like gas circulation path 14 are provided in the first electrode 10 with penetrating two conductive plates 15 and 15 in the direction of plate thickness. Here, the gas exhaust holes 13 and 13 are independent of the gas circulation path 14, and are connected to the gas circulation path 14 only through a throttling part described later.

In both opposing faces of two conductive plates 15 and 15 constituting the first electrode 10, not only a shallow wide groove is formed so as to connect the coolant supply hole 11, coolant reserving hole 18, coolant exhaust hole 12, and coolant reserving hole 18 in order, but also a shallow narrow groove is formed so as to connect the gas circulation path 14 with gas exhaust holes 13 and 13 in both sides. The former groove formed in both opposing faces forms an annular coolant circulation path 16 between the conductive plates 15 and 15 with being joined, and the latter groove forms throttling parts 19 and 19 between the gas circulation path 14 and gas exhaust holes 13 and 13 in both sides.

In one rigid body spacer 20, a coolant supply hole 21 and a coolant exhaust hole 28 which communicate respectively with the coolant supply hole 11 and coolant reserving hole 18 of the first electrode 10 are provided with penetrating in the direction of plate thickness. In another rigid body spacer 20, a coolant reserving hole 28 and a coolant exhaust hole 22 which communicate respectively with the coolant reserving hole 18 and coolant exhaust hole 12 of the first electrode 10 are provided with penetrating in the direction of plate thickness.

In the discharge cell according to this embodiment, a coolant supply path in the vertical direction which continues in the module-stacked direction is formed by joining the coolant supply hole 11 of the first electrode 10 with the coolant supply hole 21 of the rigid body spacer 20. In addition, a coolant exhaust path in the vertical direction which continues in the module-stacked direction is formed by joining the coolant exhaust hole 12 of the first electrode 10 with the coolant exhaust hole 22 of the rigid body spacer 20. Furthermore, a couple of coolant reserving paths in the vertical direction in both sides which continues in the module-stacked direction is formed by joining the coolant reserving holes 18 and 18 of the first electrode 10 with the coolant reserving holes 28 and 28 of the rigid bodies 20 and 20. Moreover, a couple of virtical gas exhaust paths in both sides which continues in the module-stacked direction is formed by joining the gas exhaust holes 13 and 13 of the first electrode 10 with the gas exhaust holes 23 and 23 of the rigid body spacers 20 and 20.

The coolant supply path, coolant exhaust path, and gas circulation path in the vertical direction communicate with the external of the tank by openings, which are provided in the upper end plate, and a pipe connected to each opening. On the other hand, the lower end plate functions as a cover plate that closes these ways. The couple of coolant reserving paths in both sides in the vertical direction are blocked by the upper and lower end plates.

When generating ozone, a raw material gas is supplied in the tank that contains the discharge cell. In addition, cooling water is supplied to a coolant feeding-in path. In this status, a high voltage is applied to the second electrode 32 provided in the dielectric body unit 30 of each cell module, and a silent discharge is generated in the discharge gaps 50 and 50.

The raw material gas supplied in the tank flows from the front and back into each discharge gap 50 in each cell module, and becomes ozone gas by being exposed to a discharge in process of flowing toward a central part in the fore-and-aft direction. The ozone gas generated in each discharge gap 50 reaches gas feeding-out holes 13 and 13 from the gas circulation path 14, provided in each first electrode 10, through the throttling parts 19 and 19 in both sides, and is taken out above the discharge cell through a couple of virtical gas exhaust paths in both sides that is formed in both sides of the discharge cell to be further taken out from the tank.

Here, the throttling parts 19 and 19 has an effect of making a flow rate of a gas flowing in each module equalize by increasing the flow velocity of the ozone gas which flows in from the gas circulation path 14 and exhausting the ozone gas into the gas exhaust path with giving suitable circulation pressure loss.

A part of the cooling water supplied into the coolant supply path in the vertical direction directly enters into the coolant circulation path 16 from the coolant supply hole 11 provided in each first electrode 10 of each cell module, and reaches the coolant exhaust hole 12 through the coolant reserving hole 18. The remainder enters into the coolant circulation path 16 through the coolant-reserving hole 18, and reaches the coolant exhaust hole 12. Thereby, each discharge gap 50 is water-cooled from a low voltage electrode side. The cooling water coming out from the coolant exhaust holes 12 of each first electrode 10 is taken out above the discharge cell through the vertical coolant exhaust path that is formed in another side of the discharge cell to be further taken out from the tank.

Figure 10:
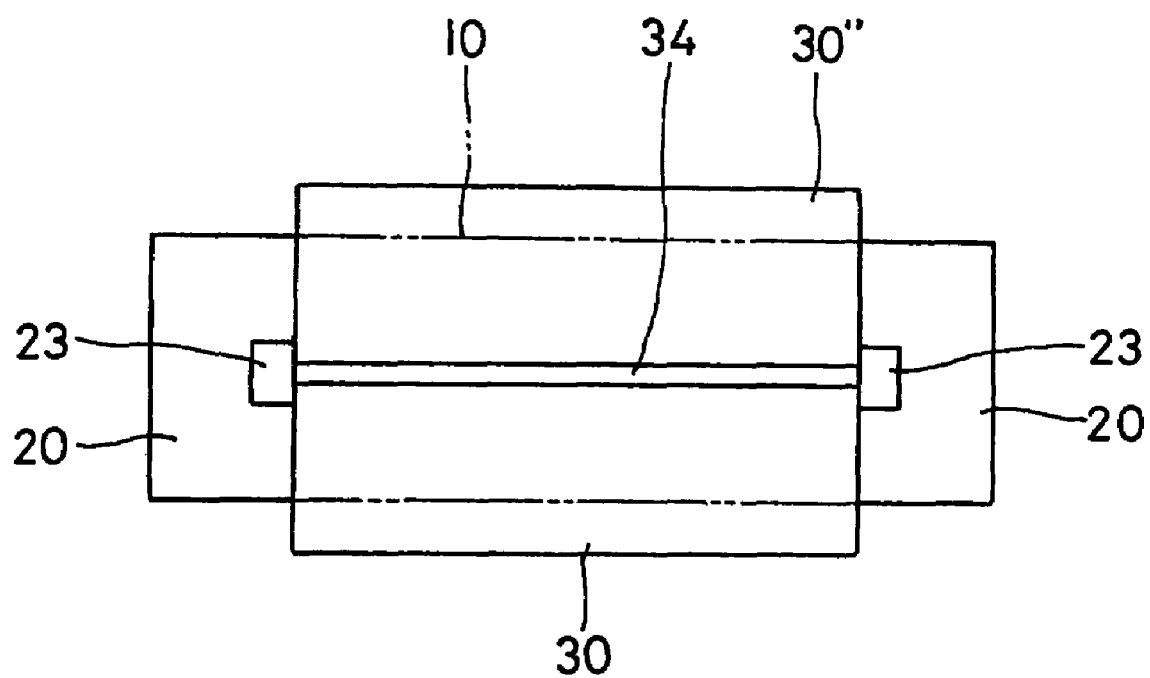
FIG. 10 is a plan of a cell module of a discharge cell for a plate type ozonizer according to further another embodiment of the present invention.

In the above-described embodiment, although the gas circulation path is provided in the upper and lower first electrodes 10 and 10, as shown in FIG. 10, it is also possible to provide the gas circulation path in the dielectric body unit 30 arranged through a discharge gap between the first electrodes 10 and 10. In FIG. 10, the dielectric body unit 30 is divide into the front and back, and a gas circulation path 34 is formed by creating clearance between a front part 30' and a back 30". The ozone gas arising in each discharge gap 50 reaches the gas exhaust holes 24 and 24 provided in the rigid body spacers 20 and 20 in both sides from the gas circulation path 34.

FIGS. 11 to 15 show an example of an ozonizer using the discharge cell according to the present invention.

Figure 11:
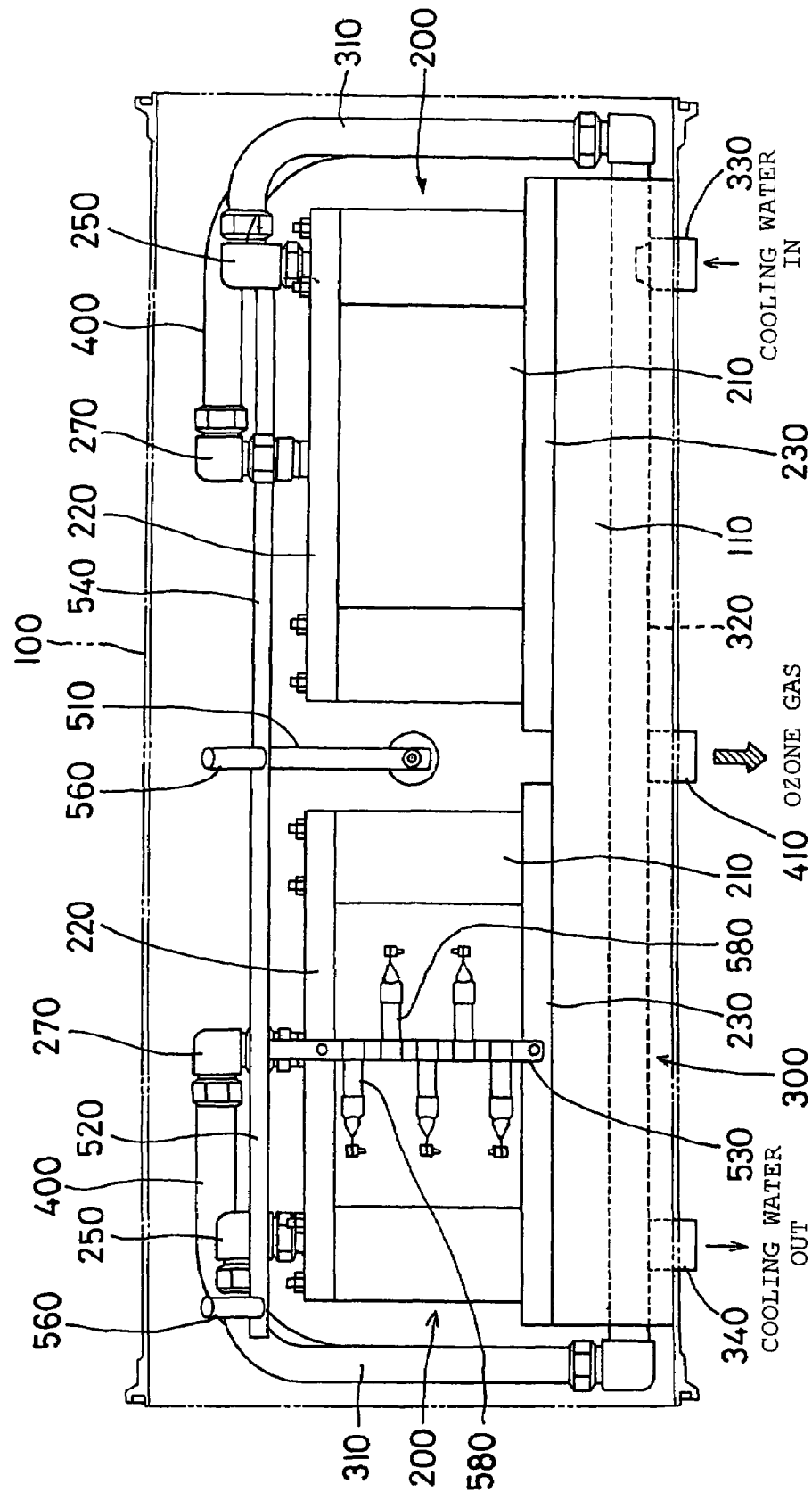
FIG. 11 is a front view showing the configuration of an example of an ozonizer using the discharge cell according to the present invention.
Figure 12:
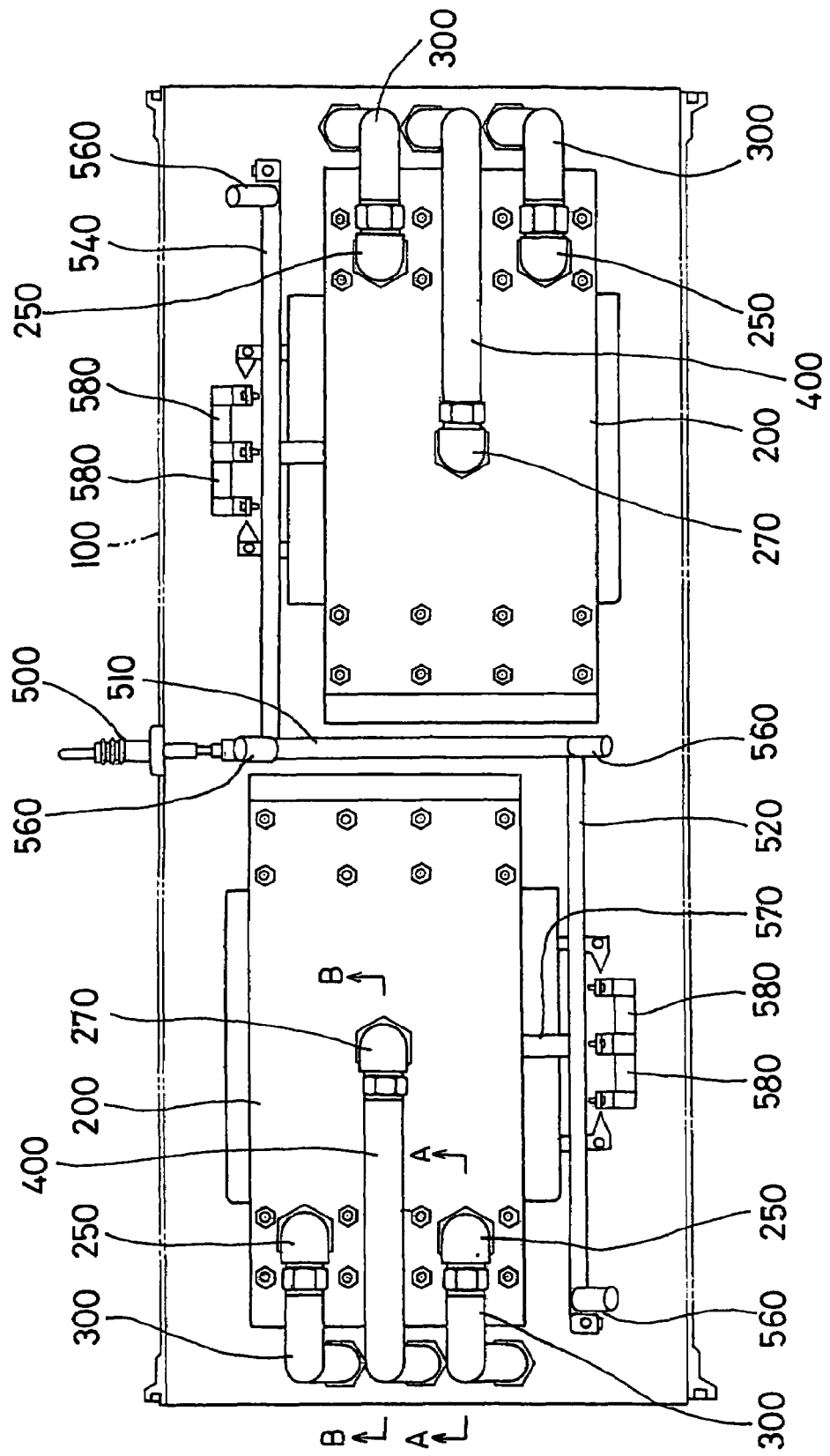
FIG. 12 is a plan of the ozonizer.
Figure 13:
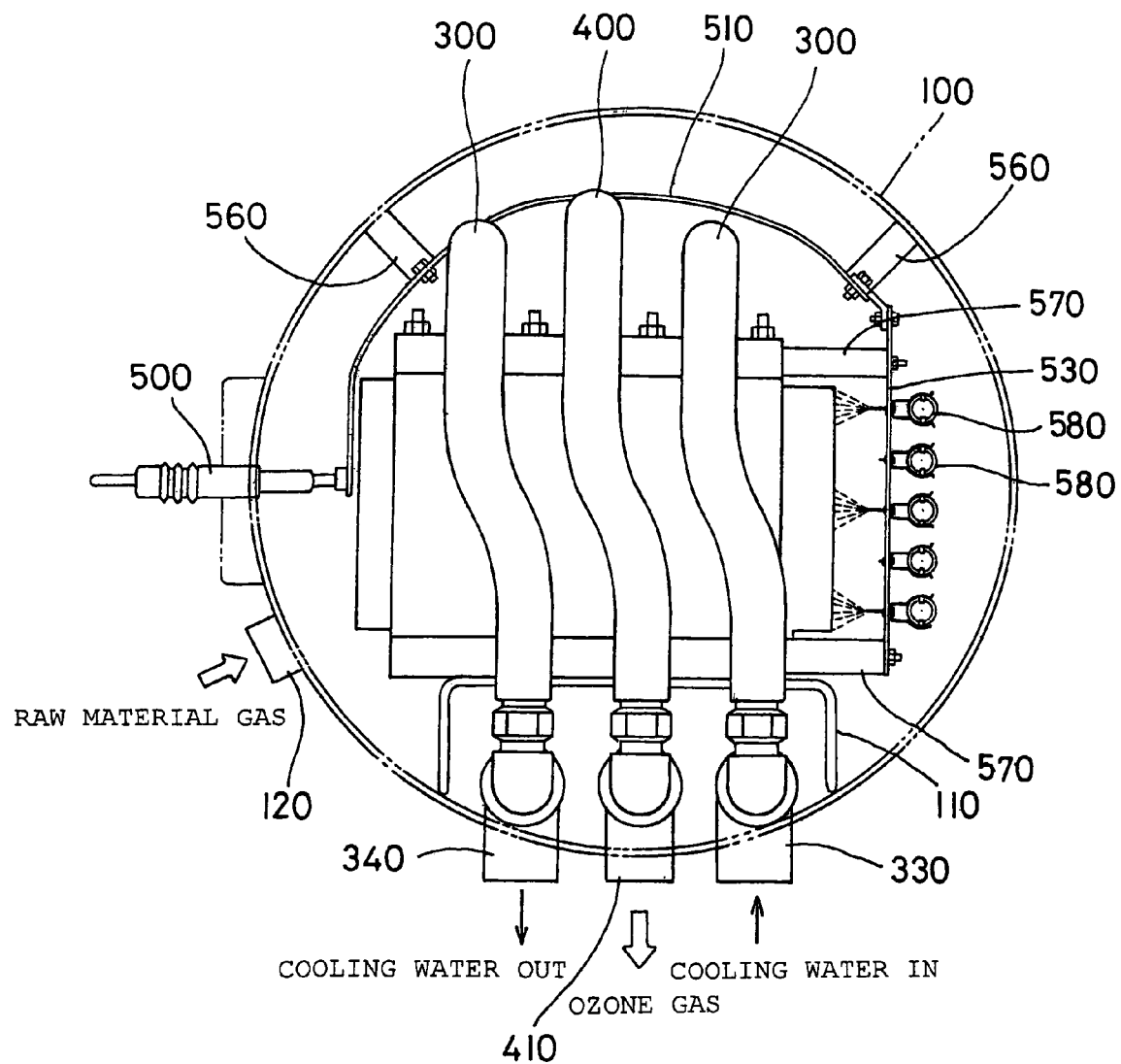
FIG. 13 is a side view of the ozonizer.

The ozonizer is equipped with a cylinder-like horizontal type tank 100 and two discharge cells 200 and 200 that are contained with being horizontally arranged in the axial direction in the tank 100 as shown in FIGS. 11 to 13. Two discharge cells 200 and 200 are fixed on a frame 110 in a tank 100 with turning order conversely, and are being fixed. Openings in both sides of the tank 100 are airtightly closed by a lid not shown.

Each discharge cell 200 is a discharge cell shown in FIGS. 1 to 4, and has the structure that a module-stacked body 210 is fixed between the upper and lower end plates 220 and 230 with two or more bolts, as described above. The end plates 220 and 230 are made of aluminum alloys.

As shown in FIG. 14, the upper end plate 220 is stacked on the first electrode 10 that is a top stage through a sealing plate 240 made of a stainless steel sheet etc. The sealing plate 240 is for closing the gas circulation path 14 of the first electrode 10 from the upward, and as for openings other than the gas circulation path 14, that is, the coolant supply hole 11, coolant exhaust hole 12, and gas exhaust holes 13 and 13, openings 241 and 242 corresponding to these are provided.

In one side of the end plate 220, two circular through holes 221 and 221 penetrating in the direction of plate thickness are provided with corresponding to the coolant supply hole 11 and coolant exhaust hole 12 of the first electrode 10 respectively. Perpendicular mounting parts of L-shaped piping joint members 250 and 250 penetrate in the through holes 221 and 221. Each piping joint member 250 has a flange part 251 in the lower part of the mounting part. The flange part 251 fits with an annular concavity 222 formed by cutting an undersurface of the end plate 220 in a circumference of the through hole 221. Furthermore, sealing between the flange part 251 and a sealing plate 240 is performed around the through hole 221 by an annular sealing member 260 fitting into a concavity 222 with this flange part 251.

Owing to this, piping joint members 250 and 250 are directly joined to a manifold way for coolant supply and a manifold way for coolant exhaust, which are formed in one side of a module-stacked body 210 in the vertical direction, respectively. In addition, each piping joint member 250 becomes rotatable around the axis of the mounting part, and it becomes possible to freely change the direction of a horizontal port part.

On the undersurface of the endplate 220, a comparatively large groove 223 for gas collection is provided from the gas exhaust holes 13 and 13 in both sides of the first electrode 10 to a central part thereof. A circular through hole penetrating in the direction of plate thickness is provided in the central part of the end plate 220 so that the circular through hole may communicate with the groove 223, and the mounting part of the piping joint member 270 is airtightly attached in this through hole by screwing.

Figure 15:
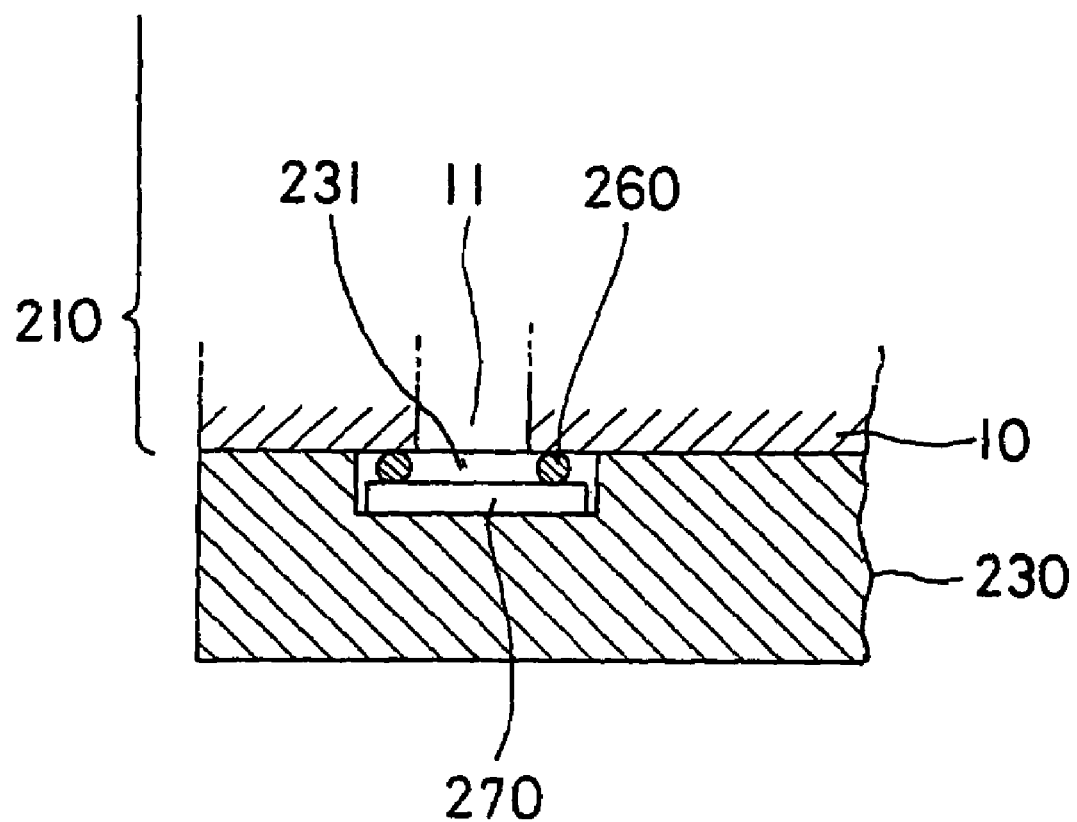
FIG. 15 is a sectional view that is taken by line A-A in FIG. 12 and shows a lower end plate portion.
Figure 16:
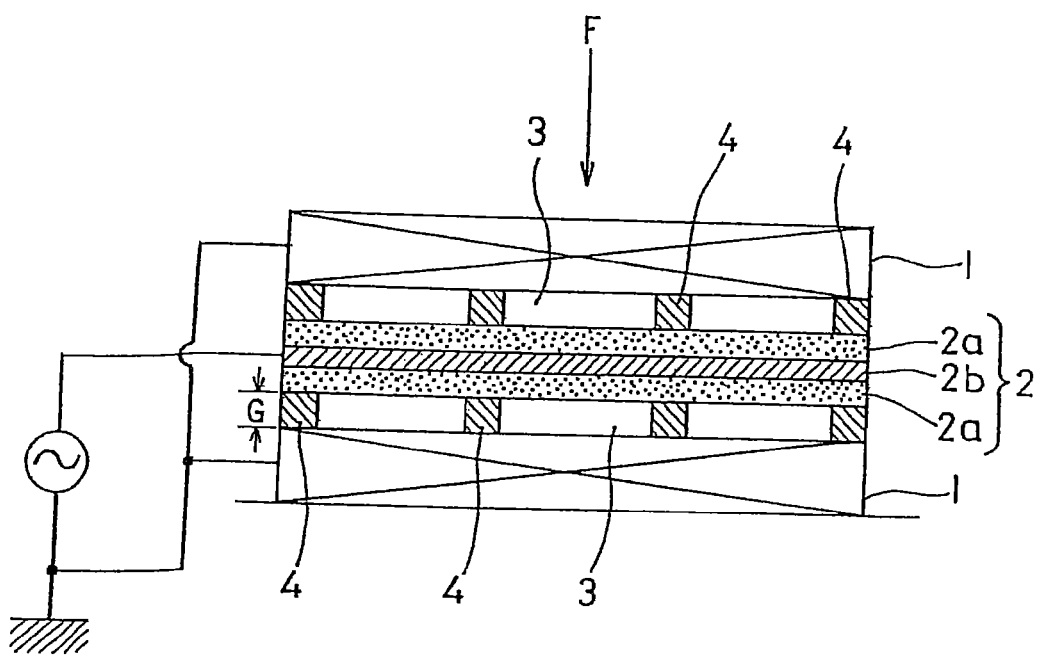
FIG. 16 is a schematic structural diagram of a discharge cell for a conventional plate type ozonizer.

The lower end plate 230 is directly stacked under the bottom of the first electrode 10 as shown in FIG. 15. In one side of the end plate 230, two circular concavities 231 and 231 are provided with corresponding to the coolant supply hole 11 and coolant exhaust hole 12 of the first electrode 10 respectively. In each concavity 231, a cover plate 270, made of a stainless steel plate etc., and an annular sealing member 260 are contained, and these block the manifold way for coolant supply and manifold way for coolant exhaust, which are formed in the one side of the module-stacked body 210 in the vertical direction, in the lower end thereof without interfering with the lower end plate 230.

Each port part of the piping joint members 250 and 250 is connected to the corresponding piping joint members 250 and 250 of another discharge cell 200, which is arranged in the side of the concerned discharge cell 200, by manifolds 300 and 300. Each manifold 300 has a vertical piping part 310 provided along the outer side of the discharge cell 200, and the horizontal piping part 320 horizontally provided under a frame 110. From a part of the horizontal piping part 320 in the longitudinal direction, a coolant supply pipe 330 in one manifold 300 and a coolant exhaust pipe 340 in another manifold 300 branch below respectively to protrude outside the tank 100.

Similarly, the piping joint member 270 is connected to the corresponding piping joint member 270 of another discharge cell 200, which is arranged in the side of the concerned discharge cell 200, by a manifold 400. Each manifold 400 has a vertical piping part provided along the outer side of the discharge cell 200, and a horizontal piping part horizontally provided under the frame 110. From a part of the horizontal piping part in the longitudinal direction, a gas exhaust pipe 410 branches below to protrude outside the tank 100.

Next, an electric supply system in the discharge cells 200 and 200 will be described.

This electric supply system comprises an external terminal area 500 attached in a central part of the tank 100, an arc-shaped first lead part 510 provided along the inner side of the tank 100 in a central part of the tank 100, a transverse second lead part 520 provided from the termination of the first lead part 510 toward one discharge cell 200, a longitudinal third lead part 530 provided from the second lead part 520 downward along the front face side of one discharge cell 200, a transverse fourth lead part 540 provided from a node of the external terminal area 500 and first lead part 510 toward another discharge cell 200, a longitudinal lead part that is equivalent to the third lead part 530 and is provided from the fourth lead part 540 downward along the front face of the other discharge cell 200.

The first lead part 510, second lead part 520, and fourth lead part 540 are fixed to the inside of the tank 100 through an insulator 560. The third lead 530 is attached in the front central part of the corresponding discharge cell 200 with a couple of upper and lower insulators 570 and 570.

Then, in each discharge cell 200, terminal areas 32' provided in the second electrode 32 in the dielectric body unit 30 are stacked in positions, where the left and the right are alternated, every predetermined number of modules continuing in the module-stacked direction. Each stacked part is connected to the longitudinal third lead part 530 attached in the front face of the discharge cell 200 through a tube fuse 580 by turns from the right and left.

In the above-described ozonizer, a predetermined high voltage is applied to the external terminal 500. In addition, cooling water is supplied from the coolant supply pipe 330 into one manifold 300. In this status, a raw material gas is supplied into the tank 100 from the gas supply pipe 120 provided in the tank 100.

In each discharge cell 200, since a predetermined high voltage is applied to the second electrode 32 in each module by applying a predetermined high voltage to the external terminal 500, a discharge arises in the discharge gaps 50 and 50. In this status, since being supplied into the tank 100, a raw material gas is ozonized in the discharge gaps 50 and 50 in each module. The ozone gas goes up through the manifold way for ozone gas exhaust that is vertically formed in both sides of each discharge cell 200, and is exhausted outside the tank 100 from the gas exhaust pipe 410 after passing through the groove 223 of the upper endplate 220, joint member 270, and manifold 400.

Cooling water supplied into one manifold 300 from the coolant supply pipe 330 flows from one piping joint member 250 into a manifold way for coolant supply, which is vertically formed in one side of each discharge cell 200, from the above, and is supplied to the first electrodes 10 and 10 in each module. Cooling water exhausted from the first electrodes 10 and 10 in each module flows into the manifold way for coolant exhaust that is vertically formed in one side of each discharge cell 200, and is exhausted outside the tank 100 from the coolant exhaust pipe 340 after passing through another manifold 300 from the piping joint member 250.

Since forming an oxide film on an aluminum alloy, ozone gas does not corrode the end plate 220 made of an aluminum alloy. On the other hand, cooling water quickly corrodes an aluminum alloy. However, the manifold way for coolant supply and the manifold way for coolant exhaust which are vertically formed in one side of each discharge cell 200 are directly joined to the piping joint members 250 and 250 without passing through the end plates 220 and 230 made of an aluminum alloy. For this reason, although the end plates 220 and 230 are made of a lightweight aluminum alloy, corrosion by the cooling water is prevented.

As for a cooling water supply/exhaust system, since the manifold way for coolant supply and the manifold way for coolant exhaust are formed in the module-stacked body 210 of each discharge cell 200, piping joint members are eliminated from each module, and hence the thickness of the first electrodes 10 and 10 which are coolers is reduced. In consequence, the overall height of the discharge cell 200, and by extension, the height of the tank 100 is reduced without degrading performance.

In addition, not only a complicated external piping system formed by combining many branch pipes is eliminated from the tank 100, but also the same kind of manifold ways formed in the module-stacked body 210 of each discharge cell 200 are interconnected with the manifold 300 within the tank 100. Hence, in spite of combining two discharge cells 200 and 200 together, only two manifolds 300 and 300 serve as external piping for coolants in the tank 100, and hence, the number of pipes are only three even if the manifold 400 for ozone gas exhaust is included.

Owing to this also, the tank 100 is miniaturized.

As described above, a discharge cell for an ozonizer according to the present invention can stably secure the minimum discharge gap amount G of 0.2 mm or less in a mass production level by forming by a rigid body spacer a space in which a dielectric body unit is contained, independently containing the dielectric body unit in the space, and supporting the dielectric body unit in a neutral position in the space with spacers for discharge gap formation in both sides, and furthermore can effectively avoid the breakage of a cell component and the upsizing of a pressurizing mechanism (clamping mechanism).

In addition, since it becomes unnecessary to take out ozone gas from front and back faces of a discharge cell in spite of performing parallel flow gas circulation by ozonizing a raw material gas supplied in the discharge gap from two opposing directions and exhausting the ozone gas in the direction perpendicular to the gas flow, it is possible to simplify a taking-out mechanism, and to aim the miniaturization of an apparatus and the reduction of manufacturing cost thereof.

Furthermore, it becomes possible to remarkably thin a cooler by making the cooler, provided along a discharge gap for cooling the discharge gap, be a thin plate, and to construct a small and highly efficient ozonizer owing to thinning of the cell module by this.

Moreover, since it is possible to remarkably reduce electrode formation cost by supporting a second electrode between a couple of dielectric bodies after forming the second electrode with a conductive thin plate, the manufacturing cost can be suppressed drastically.

In addition, since electric insulation distance to the first electrode or a member having potential equal to that of the first electrode is fully securalble by widening a couple of dielectric bodies more than the second electrode and protruding the edge of a couple of approximately entire dielectric bodies outward than the edge of the second electrode, it is possible to secure high reliability that an unusual discharge etc. does not arise.

In addition, since it is possible to eliminate piping joint members from each cooler by forming a manifold way for coolant supply and a manifold way for coolant exhaust, which are shared between coolers, in a module-stacked body, and to eliminate a complicated external piping system formed by combining many branch pipes from the apparatus, it is possible to sharply downsize the apparatus in the module-stacked direction and a direction perpendicular to this.

What is claimed is:

1. A discharge cell for an ozonizer, comprising:
a module-stacked body constituted by stacking a plurality of cell modules in a direction of plate thickness wherein a plate shaped cell unit is one module, the module-stacked body being accommodated in a tank to which raw material gas is supplied to introduce raw material gas to a discharge gap of the plural cell modules to produce ozone, the discharge gaps formed by a plate-like first electrode, a dielectric body and a second electrode,
wherein the first electrode includes a cooler provided with coolant circulation, the cooler being a thin plate shaped cooler where a coolant path is formed between flat metal plates by stacking the flat metal plates in a direction of plate thickness;
wherein a manifold way for coolant supply and a manifold way for coolant exhaust which are shared between each cooler are formed in the module-stacked direction in the module-stacked body; and
wherein a manifold way for ozone gas, which is shared between each cell module, is formed in the stacked direction in the module-stacked body so as to take out ozone gas generated in the discharge gap of each cell module to outside an apparatus.

2. The discharge cell for an ozonizer according to claim 1, wherein each of the cell modules comprises a couple of the first electrodes constituted by a plate-like rigid body, and a dielectric body unit that is composed of a plate-like rigid body, wherein the second electrode is sandwiched between a couple of the dielectric bodies, and is positioned between the first electrodes to form a couple of discharge gaps with the couple of first electrodes.

3. The discharge cell for an ozonizer according to claim 1, wherein the thickness of the thin plate shaped cooler is 5 mm or less.

4. The discharge cell for an ozonizer according to claim 1, wherein a plurality of manifold ways open in the same end face side in a module-stacked direction.

5. The discharge cell for an ozonizer according to claim 1, wherein sealing between stacked members is performed in the manifold ways for coolant supply, and for coolant exhaust, and sealing between stacked members is not performed in the manifold ways for ozone gas.

6. The discharge cell for an ozonizer according to claim 1, wherein the module-stacked body is fixed by end plates arranged in both end parts in the module-stacked direction, and each joint member for connecting with external piping, manifold ways for coolant supply and for coolant exhaust, which are formed in the module-stacked direction of the module-stacked body is directly connected with each manifold way, with making each joint member penetrating the end plate in a direction of plate thickness of the end plate.

7. The discharge cell for an ozonizer according to claim 1, wherein each cell of the modules further comprises a gas exhaust system where ozone gas is exhausted in the direction perpendicular to the direction of gas circulation from a middle part in the direction of gas circulation within the discharge gap against a raw material gas supplied along both sides of the dielectric body in two opposing directions respectively into the couple of discharge gaps.

8. The discharge cell for an ozonizer according to claim 7, wherein the gas exhaust system exhausts the ozone gas from a middle part in the direction of gas circulation in a discharge gap toward a side of the discharge gap.

9. The discharge cell for an ozonizer according to claim 8, wherein ozone gas exhausted toward a side of the discharge gap is exhausted through the manifold ways for ozone gas formed in the module-stacked direction.

10. The discharge cell for an ozonizer according to claim 7, wherein a gas circulation path, which leads the ozone gas to a direction substantially perpendicular to a direction of raw material gas circulation, is provided in the first electrode and/or the dielectric body so as to exhaust the ozone gas toward a side of a discharge gap in a middle part in the direction of gas circulation in the discharge space.

11. The discharge cell for an ozonizer according to claim 1, wherein the second electrode is made of a conductive thin plate.

12. The discharge cell for an ozonizer according to claim 11, wherein the thickness of the thin plate is made to be 200 μm or less.

13. The discharge cell for an ozonizer according to claim 11, wherein the dielectric body is widen more than the thin plate and substantially all edge of the dielectric body is protruded outward than an edge of a thin plate.

14. The discharge cell for an ozonizer according to claim 13, wherein the dielectric body is joined in at least a part outer than an edge of the thin plate.

15. The discharge cell for an ozonizer according to claim 14, wherein a junction is separated from an inner thin plate.

16. The discharge cell for an ozonizer according to claim 11, wherein a terminal area is formed by drawing out a part of an edge of the thin plate in a belt-like shape from between the dielectric bodies.

17. The discharge cell for an ozonizer according to claim 16, wherein a heat radiation-promoting member is attached in the terminal area.

18. The discharge cell for an ozonizer according to claim 11, wherein a front end part and a back end part of the thin plate are protruded forward and backward respectively by 2 to 20 mm from a front end part and a back end part of the first electrode.

19. The discharge cell for an ozonizer according to claim 11, wherein the dielectric bodies are joined in both sides of the thin plate.

20. The discharge cell for an ozonizer according to claim 1, wherein the cell module comprises:
a couple of the first electrodes constituted by a plate-like rigid body;
a rigid body spacer for space formation, arranged between the couple of first electrodes, which forms a space with a gap amount being fixed therebetween; and
a dielectric body unit that is composed of a plate-like rigid body constituted with sandwiching the second electrode between the couple of dielectric bodies, and is supported in a neutral position of the space by a spacer for discharge gap formation that is arranged in both sides to form a couple of discharge gaps with the couple of first electrodes.

21. The discharge cell for an ozonizer according to claim 20, wherein the spacer for discharge gap formation is an elastic body spacer that is inserted in at least one position in each discharge gap with being compressed and supports the dielectric body unit in the neutral position in the space with elastically pressing the dielectric body unit from both sides by the compression.

22. The discharge cell for an ozonizer according to claim 20, wherein the spacer for discharge gap formation is a rigid body spacer that is arranged in at least one position in each discharge gap and has a thickness smaller than $(G'-T)/2$, which $G'$ is a gap amount of the space, and $T$ is the thickness of the dielectric body unit.

23. The discharge cell for an ozonizer according to claim 22, wherein the thickness of the spacer for discharge gap formation is 80% or more of the (G'−T)/2.

24. The discharge cell for an ozonizer according to claim 1, wherein the manifold way for coolant supply, the manifold way for coolant exhaust and the manifold way for ozone gas are formed outside the dielectric body in the module-stacked body.

25. The discharge cell for an ozonizer according to claim 24, wherein the manifold way for coolant supply, the manifold way for coolant exhaust and the manifold way for ozone gas are formed in a stacked portion between the rigid body spacer and the first electrodes arranged outside the dielectric body in the module-stacked body.

* * * * *